(12) United States Patent
Edwards

(10) Patent No.: US 12,340,472 B2
(45) Date of Patent: Jun. 24, 2025

(54) SYSTEMS AND METHODS FOR MANAGING NETWORK DEVICES USING AUGMENTED REALITY

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 295 days.

(21) Appl. No.: 17/902,590

(22) Filed: Sep. 2, 2022

(65) Prior Publication Data

US 2024/0078761 A1 Mar. 7, 2024

(51) Int. Cl.
- *G06T 19/00* (2011.01)
- *H04W 4/20* (2018.01)
- *H04W 4/33* (2018.01)
- *H04W 4/02* (2018.01)

(52) U.S. Cl.
CPC .......... *G06T 19/006* (2013.01); *H04W 4/20* (2013.01); *H04W 4/33* (2018.02); *H04W 4/025* (2013.01)

(58) Field of Classification Search
CPC ........ G06T 19/006; H04W 4/33; H04W 4/20; H04W 4/025
See application file for complete search history.

(56) References Cited

U.S. PATENT DOCUMENTS

| | | |
|---|---|---|
| 6,054,950 A | 4/2000 | Fontana |
| 7,769,851 B1 | 8/2010 | Guruswamy et al. |
| 8,090,616 B2 | 1/2012 | Proctor, Jr. et al. |
| 8,199,047 B2 | 6/2012 | Fretenburg et al. |
| 9,965,564 B2 | 5/2018 | Whelihan |
| 10,220,510 B2 | 3/2019 | Bruemmer et al. |
| 10,365,363 B2 | 7/2019 | Rohr et al. |
| 10,469,988 B2 | 11/2019 | Kean et al. |
| 10,484,833 B1 | 11/2019 | Torborg |
| 10,666,768 B1 | 5/2020 | Johnson |
| 11,394,729 B2 | 7/2022 | Verma |
| 11,635,808 B2 | 4/2023 | Nagar et al. |
| 2006/0031488 A1 | 2/2006 | Swales |
| 2014/0085526 A1* | 3/2014 | Takahashi .......... H04N 1/00326 348/333.02 |
| 2015/0029220 A1* | 1/2015 | Hittel .................... H04W 4/029 345/633 |
| 2015/0382436 A1 | 12/2015 | Kelly et al. |
| 2016/0277130 A1* | 9/2016 | Nishioka ............... G06F 1/1694 |

(Continued)

OTHER PUBLICATIONS

Grinter et al., "The Work to Make a Home Network Work," In Proc. ECSCW'05 pp. 1-20 (2005).

(Continued)

*Primary Examiner* — King Y Poon
*Assistant Examiner* — Vincent Peren
(74) *Attorney, Agent, or Firm* — Haley Guiliano LLP

(57) ABSTRACT

Systems and methods are described herein for controlling network devices in an augmented reality environment. A user may point a second network device at a first network device to determine a network activity the first network device. The second network device may display a user control interface to enable the user to control the network activity of the first network device (e.g., a pinch gesture control). In response to receiving the user input, the second network device causes the modification of the network activity based on the user input.

18 Claims, 15 Drawing Sheets

(56) References Cited

U.S. PATENT DOCUMENTS

| | | |
|---|---|---|
| 2016/0278044 A1* | 9/2016 | Nishioka ............... H04W 16/28 |
| 2016/0349362 A1 | 12/2016 | Rohr et al. |
| 2018/0059231 A1 | 3/2018 | Dewberry et al. |
| 2019/0340819 A1 | 11/2019 | Chandrashekarappa et al. |
| 2021/0021483 A1 | 1/2021 | Higgins et al. |
| 2021/0051197 A1 | 2/2021 | Carpenter |
| 2021/0132781 A1 | 5/2021 | Daniels et al. |
| 2021/0365681 A1 | 11/2021 | Huo et al. |
| 2023/0188832 A1* | 6/2023 | Xu ..................... G06F 3/04817 |
| | | 348/333.01 |
| 2024/0080366 A1 | 3/2024 | Edwards |

OTHER PUBLICATIONS

Poole et al., "More Than Meets the Eye: Transforming the User Experience of Home Network Management," Proceedings of ACM DIS pp. 455-464 (2008).

Shehan et al., "Home Networking and HCI: What Hath God Wrought?" CHI (ACM Press) pp. 1-10 (2007).

Yang et al., "Eden: Supporting Home Network Management Through Interactive Visual Tools," UIST' 10 (ACM) pp. 1-10 (2010).

Yang et al., "ICEbox: Toward Easy-to-Use Home Networking," Interact 197-210 (2007).

U.S. Appl. No. 17/902,593, filed Sep. 2, 2022, Warren Keith Edwards.

\* cited by examiner

300 →

| UWB Identifier | Relative Direction | Relative Distance | Network Identifier | Name | Device Type | ... |
|---|---|---|---|---|---|---|
| 2f:98:c1:fe:65:1a:7a:b3 | 0.2931/0.9551/0.5332 | 4.2 | 192.168.1.22 | Living Room TV | TV | ... |
| 3a:52:71:c3:33:a2:b6:11 | 0.6921/0.3362/0.8774 | 0.7 | 192.168.1.14 | Keith's Tablet | Tablet | ... |
| ... | | | | | | ... |

| Source | Destination | Service Characterization | MB/S | ... |
|---|---|---|---|---|
| 192.168.1.15 | 192.168.1.23 | Video Casting | 13.2 | ... |
| 192.168.1.8 | 43.192.23.233 | Messaging | 0.2 | ... |
| 50.18.18.12 | 192.168.1.32 | Gaming | 5.2 | ... |
| ... | | | | ... |

FIG. 3B

SYSTEMS AND METHODS FOR MANAGING NETWORK DEVICES USING AUGMENTED REALITY

BACKGROUND

This disclosure is generally directed to systems and method for managing network devices using augmented reality. In particular, systems and methods are provided herein that allow for the detection of network devices using wireless communications and indicating a position of the network device in an augmented reality environment. Additionally, systems and methods provided herein allow for the controlling of such detected network devices using user input provided within the augmented reality environment.

SUMMARY

With the proliferation of internet of things ("IoT") devices in the home, the challenge of managing these devices has increased. Not only are there more devices within a home, but oftentimes each of the devices require their own specialized app or interface for controlling the device, rather than a centralized management interface. For example, a smart speaker by one manufacturer may have a different control interface from a smart speaker made by a second manufacturer. Oftentimes, a household may contain multiples of a same device (such as a smart speaker in each room)—making it difficult for a user to locate and control a desired one of the multiple devices. Furthermore, many of the specialized applications and interfaces focus primarily at the application layer rather than lower layers of the network. For example, an application on a smart speaker may allow a user to control a streaming audio quality, but does not allow for network layer control of a network activity.

Additionally, troubleshooting the network devices is difficult as the applications oftentimes do not have capabilities for diagnosing network issues which may prevent the network device from functioning properly. For example, the control application of a network device may not provide an indication of a Wi-Fi signal strength, thereby making it difficult for a user to diagnose whether reduced bandwidth at a network device is due to a location of the network device within a home (e.g., low signal strength) or due to network congestion (e.g., other devices consuming network bandwidth). Accordingly, the specialized applications and interfaces fail to address problems around bandwidth allocation, wireless signal strength, management of data caps, etc. While some router management interfaces may allow for controlling lower layers of the network stack, these interfaces are difficult for a typical household user and do not allow for the easy identification and control of devices within the home. For example, it may be difficult for a user to identify which devices are consuming network traffic and to where the network traffic is going. Furthermore, many of these applications produce abstract interfaces which do not correspond well with a user's intuitive physical and spatial model of home networking.

To address the aforementioned problems, systems and methods are described herein for identifying, managing, and controlling network devices in an augmented reality environment. In one embodiment, the systems and methods described herein identify one or more network devices using augmented reality. The systems and methods described herein utilize the wireless radios (e.g., ultra-wide band ("UWB") radios) of network devices to determine a position of a first network device relative to a position of a second network device.

The second network device may generate an image from the camera on a display of the second device and indicates a position of the first network device within the image. In some instances, the second network device includes an optical see-through (OST) display that is at least partially transmissive of light and that enables a user to view objects in their environment, as though looking through a window. If desired, the first network device may be viewed through such an OST device. Alternatively, the display of the first network device may be a video see-through (VST) device that generates and displays a digital image that has been captured via a camera. In any event, the image may be generated, displayed, or provided in or near real-time, enabling the user to view his or her environment via a screen of a phone, for example. For example, the first network device may be a smart speaker located in a living room and the second network device may be a smartphone. When a user points the smartphone camera to the living room, the smartphone may display an image of the living room and may augment the image with a circle (or any other type of indication) at a location of the smart speaker within the image. The second network device (e.g., the smartphone) may additionally or alternatively display an overlay at the position of the first network device within the image that includes, for example, a network address (e.g., local area network address), a name of the smart speaker (e.g., a user assigned name of first network device), a network activity (e.g., a name of the network activity consuming the most bandwidth by the first network device), etc. In other embodiments, the second network device may determine whether the first network device is visible via a display of the second network device. For example, when the display is an OST, the second network device may determine, based on a UWB signal, whether the first network device is visible via the display of the second network device by determining a position of the first network device relative to the second network device and determining whether the position would be visible via the display of the second network device.

By using the UWB signal from the first network device to detect a relative position of first network device to the second network device and generating for display an indicator and/or an overlay at the relative position within the image and/or display, the systems and methods described herein enable a user to easily identify a desired network device using an augmented reality environment. Additionally, the systems and methods provided herein may enable a user to diagnose network issues. For example, the overlay may include an indication of the bandwidth being consumed by the device, and/or by an application running on the device.

A user may utilize the information depicted in the overlay to determine whether to control and/or modify a network parameter the network device. For example, a user may wish to limit an amount of bandwidth available to the smart speaker so that they user can consume more bandwidth on a laptop. The systems and methods provided herein may provide a graphical interface for a user to control a parameter of a network activity. For example, the second network device may display a graphical dial. When the second network device detects that the user is decreasing a value on the graphical dial, the second network device may cause the bandwidth allocated to the first network device to decrease (e.g., the second network device may decrease a bandwidth cap for the first network device or may decrease a quality of service (QoS) prioritization for the network activity).

In some embodiments, the systems and methods described herein relate to an augmented reality environment for controlling and managing a network activity of the network devices. For example, when the second network device detects that the first network device is within a visual field of the camera of the second network device (e.g., based on a UWB signal from the first network device), the second network device retrieves a network address of the first network device (e.g., a local area network address of the first network device). In some embodiments, based on the first network address, the second network device determines a network activity of the first network device. For example, the second network device may query a router for the network activity of the first network device based on the network address. In another example, the second network device may transmit a query to the first network device requesting information about the network activity. In response to the query, the router and/or first network device may provide the second network device with an identification of the network activity (e.g., the response may include an indication of a bandwidth consumed by the first network device and an indication of what application is using the most bandwidth, and an indication of the source/destination of the network activity). The second network device may generate for display a status of a parameter of the network activity. For example, the second network device may generate for display the bandwidth that is currently being consumed by the second network device for the given application.

The second network device may generate for display a graphical interface for controlling the parameter of the network activity. For example, the second network device may generate for display a slider bar where the user can increase or decrease the bandwidth for the first network device based on the position of the slider. In response to receiving a user input via the graphical interface, the second network device may adjust the parameter of the network activity based on the user input. For example, the second network device may transmit a command to the router to throttle the bandwidth of the first network device in response to receiving an input via the bandwidth slider as described above. In another embodiment, the second network device may transmit the request to the application running on the first network device. For example, the second network device may transmit a request to adjust the bandwidth to a music streaming application running on the smart speaker.

In some aspects, the overlay is displayed in response to selecting the first network device within the image and/or display. For example, in response to selecting the first network device, the systems described herein may display information about the network activity of the first network device. The overlay may include an indication of the bandwidth used by the first network device, an application associated with the bandwidth consumption, and a line pointing to the first network device within an image and/or display, etc.

In some aspects, the first network device and the second network device comprise one or more wireless radios. The one or more wireless radios may include a UWB radio and a WIFI radio. The second network device may determine an approximate position of the first network device (e.g., a distance) relative to the second network device based on time of flight of a UWB signal from the first wireless radio of the first network device detected by the UWB radio of the second network device. In some embodiments, the UWB radio of the second network device may comprise one or more antennas for determining a position of the first network device relative to the second network device based on an angle of arrival of the signal. For example, when the second network device detects a UWB signal at the wireless radio of the second network device, the second network device may determine both the angle of arrival (e.g., to approximate direction) and the time of flight (e.g., to approximate distance) to calculate a relative position of a transmitting device (e.g., the first network device). In some embodiments, when an angle of arrival is used to approximate the direction of the first network device, the second network device may be able to determine the location of the first network device without the use of additional devices and/or servers.

In some embodiments, the second network device may determine the position of the first network device relative to the second network device using one or more peer devices by using, for example a two way ranging protocol. For example, a first peer device and a second peer device may compute a time of flight between a first signal sent from the first network device to the first peer device and a second signal sent from the first network device to the second peer device. Based on the different times of flights for the various signals from the first network device, the second network device may use the times of flights to triangulate the location of the first network device. In some embodiments, the peer devices may provide approximate distances to the first network device instead of the times of flight to triangulate the location of the first network device. For example, the first peer device and the second peer device may calculate respective distances to the first network device based on the computed times of flight and may provide the respective distances to the second network device.

In some embodiments, the second network device may determine the position of the first network device using, for example, a time difference of arrival protocol. For example, a first peer device and a second peer device may comprise synchronized clock signals. The first network device may transmit messages over the UWB radio at regular intervals. The first peer device and the second peer device may both receive the message at different times (e.g., because the first peer device and the second peer device are located at different distances to the first network device). The first peer device may compute a first timestamp indicating an arrival time of the message at the first peer device and the second peer device may compute a second timestamp indicating a second arrival time of the message at the second peer device. Both of the timestamps may be generated based on the synchronized clock. The timestamps may be transmitted to a server (e.g., over a Wi-Fi connection of the peer devices) that aggregates the timestamps from the peer devices having the synchronized clocks. Based on the timestamps, the server may compute an approximate location for the first network device (e.g., by triangulating the location of the first network device based on difference in time for the timestamps). In such embodiments, the second network device may retrieve the approximate position for the first network device from the server (e.g., by requesting the position over a Wi-Fi connection of the second network device).

In some aspects, the second network device may store the relative position of the first network device, the network address, and/or an identifier of the first network device in a database. The database may be stored locally (e.g., on the second network device or may be stored remote to the second network device, such as on a server). In such instances, other devices may access and/or update information about the first network device and/or add information about additional devices within the network. For example, a router may also comprise a UWB radio and may determine when a position of the first network device moves based on a UWB signal from the first network device received by the router. The router may update the database based on a detected location of the first network device.

In some aspects, the second network device may display indications of multiple devices detected within a visual range of the camera of the second device. For example, the second network device may detect a third network device (e.g., based on detecting a UWB signal from the third network device) and may determine a position of the third network device relative to the second network device. When the second network device determines that the third network device is within a visual field of the camera of the second network device (e.g., based on the determined position of the third network device relative to the second network device), the second network device may generate for display an indication of the third network device within the image and/or display. The indication may include, for example, a name of the second network device and a network address of the third network device (e.g., a network address of a WIFI connection of the third network device). In some embodiments, the indication for the third network device is displayed simultaneously with the indication for the first network device within a same virtual environment.

In some aspects, the second network device may display an indication of a network activity of the third network device. For example, the second network device may determine a network activity of the third network device (e.g., determine that the third network device is streaming a movie) and may generate for display an indication of the network activity. For example, the second network device may generate for display an icon corresponding to the streaming application and a bandwidth associated with the stream. The second network device may display the icon and indication of the bandwidth in proximity to the third network device within the image and/or display (e.g., next to the device as it appears within the image and/or display).

In some aspects, the second network device may determine that the network activity is between the first network device and the third network device an may generate for display an indication of the activity between the two devices. For example, the second network device may determine, based on network address of the network activity, that the first network device is casting a video to the third network device. Based on determining that the first network device is communicating with the third network device, the second network device may, for example, display a connection between the first network device and the third network device. In some aspects, the second network device may select a speed of the animation proportional to the a bandwidth of the network traffic between the first network device and the third network device (e.g., a higher animation speed may indicate a greater bandwidth than a slower animation speed). In another example, the second network device may generate for display the connection at a certain width based on the bandwidth of the connection (e.g., a wider connection size may indicate a larger amount of bandwidth).

In some aspects, the second network device may receive a user interface interaction to modify the parameter of the network activity (e.g., a user interface interaction to change a bandwidth or to terminate communication between devices). For example, a user may input a pinch gesture to the displayed connection to modify the bandwidth. In response to receiving the pinch gesture, the second network device may modify the bandwidth of the network activity. Subsequent to modifying the parameter of the network activity, the second network device may display an updated status of the network activity (e.g., a display the modified bandwidth in the overlay).

In some aspects, the second network device may detect that the third network device comprises a wide area network ("WAN") connection. For example, the second network device may determine that a network connection of the third network device is associated with a public IP address (e.g., that the third network device is a router with a WAN port). In response to determining that the third network device comprises a WAN connection, the second network device may visually distinguish the third network device from the first network device. For example, the third network device may be indicated as a router and may comprise a display of the network activity with devices outside of the household. For example, when a device is communicating outside of the network (e.g., via the WAN) the network address of the remote device may be visually distinguished from an address of a device within the LAN. In some embodiments, the second network device may display all of the network activities involving devices outside of the home in a panel as to not crowd the space around the third network device (e.g., the device with the WAN port).

In some aspects, a network device (e.g., the third network device) comprises storage circuitry configured to store, in a database, at least one of a source address, a destination address, a device name, a bandwidth, a priority, a duration, an access time, a network cap, and a service characterization of the network activity. In some aspects, the second device, when determining the network activity of the first network device, retrieves, from the database, the at least one of the source address, the device name, the destination address, the bandwidth, the priority, the duration, the access time, the network cap, and the service characterization of the network activity from the storage circuitry of the third network device. The second network device may include any of the information indicated above in an overlay and may allow a user to control any of such aspects via a user interface generated on a display of the second network device.

In some aspects, in response to detecting movement of the second network device (e.g., using an accelerometer or detecting a change in an image received from the camera), the second network device may determine an updated position of the first network device relative to the second network device. For example, the second network device may identify a second UWB signal from the first network device and may utilize the second UWB signal to determine an updated position of the first network device (e.g., based on the time of flights and angle of arrival of the signal).

BRIEF DESCRIPTION OF DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 3a shows an exemplary database for storing information about a device, in accordance with some embodiments of the present disclosure;

FIG. 3b shows an exemplary database for storing information about a network traffic in accordance with some embodiments of the present disclosure;

DETAILED DESCRIPTION

Figure 1A:
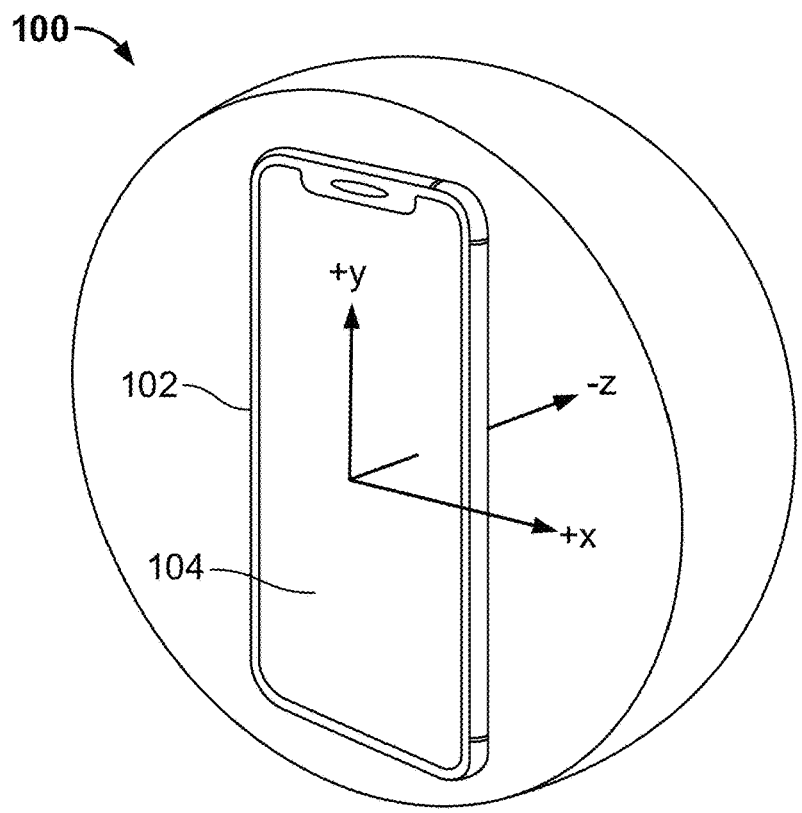
FIG. 1A and FIG. 1B shows exemplary embodiments of a network device in accordance with some embodiments of the present disclosure.

Systems and methods are described herein for identifying, managing, and controlling network devices in an augmented reality environment. Generally speaking, a network device is any device capable of wired or wireless communication with other devices. For example, a user may point a camera of an augmented reality (AR) device, such as a smartphone, smart glasses, an augmented reality headset, etc., at an environment. The AR device may be any device configured to display or provide an AR interface. The systems and methods described herein may identify network devices within the environment (e.g., a smart speaker and a smart TV) and may display an overlay at the position of the identified devices within an AR environment depicted on the AR device. For example, the AR device may comprise a UWB radio for detecting other devices with UWB radios (e.g., a smart speaker) within an environment. When the AR device detects another device having a UWB radio, the AR device may utilize a signal from the UWB radio of the other device to determine a position of the other device (e.g., the smart speaker) relative to the AR device (e.g., the smartphone). Upon determining the relative position of the identified device to the AR device, the AR device by determine a position of the identified device within the AR environment (e.g., determine where within an image and/or display the identified device is located). Upon determining where the identified device is located within the AR environment, the AR device may display an overlay at the position of the identified device within the AR environment. For example, the AR device may display an overlay near a position of the smart speaker within the AR environment. The overlay may indicate a name and/or network address of the smart speaker, a network activity of the smart speaker (e.g., indicate that the smart speaker is streaming music), a parameter of the network activity (e.g., a bandwidth), etc. In some embodiments, the overlay may include information about the network activity such that the user can diagnose network issues and/or control network devices. For example, the overlay may comprise information about a Wi-Fi signal strength at the smart speaker or an amount of bandwidth being consumed by the smart speaker for the music streaming network activity and/or other network activities of the smart speaker.

Generally speaking, UWB refers to a set of technologies utilizing low energy for short-range, high-bandwidth communications over a large portion of the radio spectrum (e.g., utilizing channels at least 500 MHz wide at the around the 3-6 GHz range). A radio transmission may be considered a UWB transmission when the emitted signal bandwidth of the transmission exceeds the lesser of 500 MHz or 20% of the arithmetic center frequency. UWB may be utilized by the disclosed systems to enable ranging or position finding.

In an embodiment, described systems implement a two-way ranging (TWR) technique, wherein multiple messages and timestamps (e.g., provided by both transmitter and receiver) are used to determine a distance between the two devices (e.g., the first and second network devices) based on time-of-flight (ToF). If multiple receivers receive and respond to the signal(s) from the transmitter, the ToFs and corresponding distances can be calculated. From there, a position of the sender (e.g., the first network device) may be triangulated relative to the other devices.

In an embodiment, time difference of arrival (TDOA) techniques are utilized. For example, the transmitter (e.g., the first network device) may transmit messages (e.g., blink messages) in regular intervals. These messages may be received by multiple clock-synced peer devices, and each may generate a time-of-arrival timestamp that the peer devices then upload to a server. The server may then analyze the differences in time-stamps to calculate a position of the transmitter (e.g., the first or second network devices).

In an embodiment, angle of arrival (AoA) techniques are utilized. For example, an estimated AoA may be calculated via measurement of the phase difference of arrival at multiple receiver antennas. The disclosed systems may utilize any desired combination of TWR, TDOA, and AoA techniques to determine (i) a relative distance between two devices and (ii) a relative direction from one device to the other. In some embodiments, the AR device may compute the position of the identified device (e.g., the smart speaker) using the AoA technique without the use of other peer devices (e.g., the AR device may be able to determine the position based on computing the angle or arrival and the time of flight).

In some embodiments, the user may select and/or control the one or more identified devices the devices within the AR environment. For example, when the AR device (e.g., the smartphone) detects a user selection of the smart speaker (e.g., an identified device) within the AR environment, the smartphone may cause the display of an interface for controlling a network parameter of the smart speaker. In some embodiments, the displayed interface for controlling the network device may be selected (by the AR device) based on the network activity and/or a parameter of the network device. For example, when the smart phone determines that a smart speaker that is streaming music, the smartphone may cause the display of a graphical slider to adjust a bandwidth of the music stream. When the AR device (e.g., smartphone) detects an interaction with the user interface, the AR device may modify the parameter of the network activity based on the interaction. For example, when the interaction moves the slider closer to a minimum value, the AR device may transmit a request to decrease a bandwidth of the network activity. In some embodiments, the AR device may communicate with the identified device (e.g., smart speaker) to cause the change in the parameter of the network activity, or may communicate with a third network device (e.g., a router or a server associated with the network activity) to cause the change. The third wireless device may comprise one or more wireless radios (e.g., a Wi-Fi radio and a UWB radio) and may communicate with the AR device and other devices using the one or more radios. For example, the AR device may transmit a request to a router to reduce a QoS prioritization of the music stream or may communicate with an application on the smart speaker to throttle the bandwidth of the music stream. In some embodiments, AR device may detect one or more gestures to perform control functions on the identified device. For example, when the AR device detects a pinch gesture, the AR device may automatically increase or decrease the bandwidth (e.g., based a finger position of the pinch gesture) and a swipe gesture may automatically terminate the network activity.

In some embodiments, changing or reducing an amount of bandwidth available for a first device may automatically modify an amount of bandwidth available for an additional device. For example, when a user decreases an amount of bandwidth available to the smart speaker, the AR device may automatically cause a bandwidth for a streaming activity of a smart TV to increase. In some embodiments, the positions and names of devices and/or parameters of the network activities of such devices may be stored on a database (e.g., one local to the AR device or remote to the AR device) such that the names, positions and/or parameters may be queried and updated by various other devices. The AR device, by identifying devices, displaying the status of devices, and enabling the control of devices within an AR environment, enables even the least tech savvy of users to both diagnose and control network activities previously only accessible to the most tech savvy.

Figure 1B:
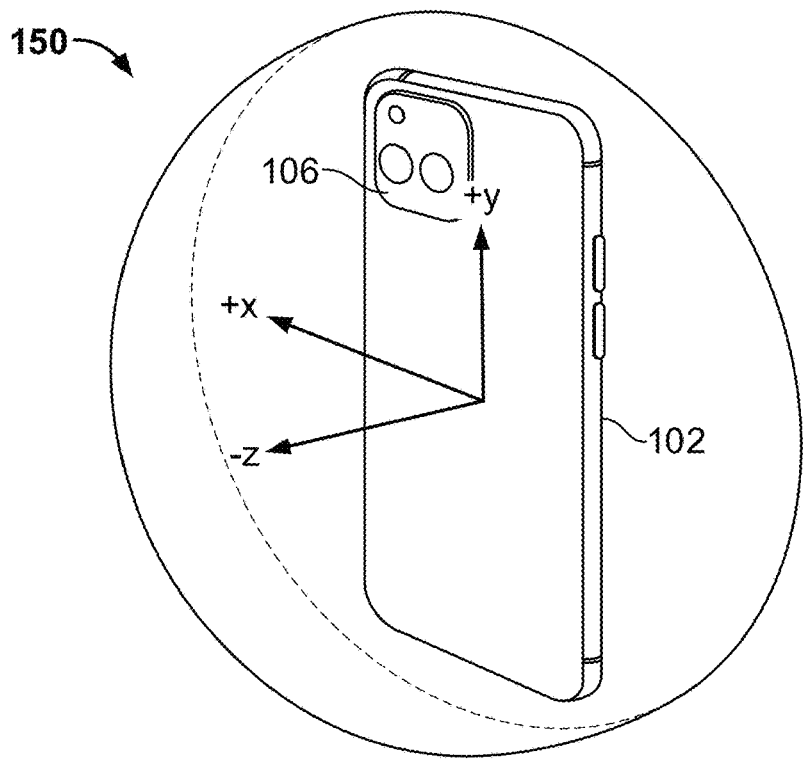

FIG. 1A and FIG. 1B shows exemplary embodiments of a network device in accordance with some embodiments of the present disclosure (e.g., an AR device). An exemplary configuration of circuitry corresponding to network device 102 is discussed further in detail in FIG. 8. Orientation 100 depicts a front of network device 102 having display 104. Network device 102 is depicted within an exemplary Cartesian coordinate system with an origin at a center of the network device 102. However, any origin for the coordinate axis system may be selected (e.g., a center originating at from a camera of network device 102 or a center originating at an antenna of a UWB radio of network device 102) and any coordinate system may be selected (e.g., a polar coordinate system). Although network device 102 is depicted as a smartphone, any device may be used without departing from the scope of the present disclosure. For example, network device 102 may be an AR headset or smart glasses. In some embodiments, display 104 may be a transparent or semi-transparent display.

The exemplary Cartesian coordinate axis system is showing having a positive Y direction to a top of network device 102, a positive X direction to a right of network device 102 and negative Z direction to a back of network device 102. In some embodiments, the coordinate system depicted orientation 100 is utilized by network device 102 to determine and store a position of another network device (e.g., a first network device, such as the smart speaker described above) relative to the second network device (e.g., network device 102). For example, when network device 102 determines a position of the first network device relative to network device 102, network device 102 may store the position of coordinates based on the coordinate system depicted in orientation 100. For example, when the position of the first network device, relative to network device 102 is below, to the right of, and behind network device 102, network device 102 may determine that the value for the Y position is negative, the value for the X position is positive, and the value for the Z position is negative. In some embodiments, network device 102 stores the relative position in storage of network device 102 (e.g., storage 808) and/or storage of a remote device (e.g., storage 808 of a server or of a router). An exemplary database for storing the relative position is described further below with respect to FIG. 3a.

In FIG. 1B, orientation 150 depicts a rear of network device 102 having camera 106. While camera 106 is depicted having two lenses, any number of lenses may be used. In some embodiments, each lens corresponds to a different image sensor and each lens may have different optical properties. In some embodiments, the distance between the lenses of camera 106, and/or the optical properties of the lenses, is known by network device 102 and may be utilized by network device 102 to compute one or more dimensions within the coordinate system for an object captured by camera 106. In some embodiments, network device 102 may additionally use values computed from one or more sensors to obtain an orientation for the lenses of camera 106 (e.g., from a gyroscope or an accelerometer). In some embodiments, network device 102 may capture a photo (or multiple photos in a sequence to form a video) and may compare a pixel disparity between objects detected in a first photo taken from the first lens and a second photo taken from the second lens. Based on the parameters known to network device 102 (e.g., the distance between the lenses, the optical properties, a resolution of the image sensor, the orientation of network device 102, etc.), network device 102 may compute a relative position of the detected object based on a disparity between the pixels for an image captured of the object. In some embodiments, where display 102 is a transparent or semi-transparent display, network device 102 may determine whether a network device is visible via a display of network device 102 based on a wireless signal, such as a UWB signal emitted from a device.

In some embodiments, network device 102 may utilize an image processing algorithm to detect an object. For example, control circuitry 804 may detect a television within a visual range of camera 106 based on applying an image processing algorithm to one or more images captured by camera 106. Network device 102 may identify pixels corresponding to the television and may compute a pixel disparity between pixels corresponding to the television from a first image captured from a first lens of camera 106 pixels corresponding to the television from a second image captured from a second lens of camera 106. For example, network device 102 may detect the television in the first image and the second image and may determine a position of the television based on the disparity between the pixels corresponding to the television in each of the images.

In some embodiments, network device 102 utilizes an image captured from cameras 106 to generate an augmented reality environment (e.g., the environment depicted and described in relation to FIGS. 2-7). For example, an environment located in the negative Z direction of network device 102 may be captured by camera 106 and displayed on display 104. In some embodiments, network device 102 generates the augmented reality environment based on a sequential capture of one or more images from camera 106 (e.g., to form a video). The image captured by camera 106 and displayed on display 104 may be automatically update based on a specified refresh rate or based on detecting a change in the orientation of network device 102 (e.g., based on detecting a changed gyroscope measurement). In some embodiments, a user may pause the capture of the video by performing an action within the augmented reality environment (e.g., selecting an object within the augmented reality environment or pressing a pause button). In such instances, the user may re-orient the network device 102 without changing the image depicted on display 104. In other instances, network device 102 may automatically update the displayed image as network device 102 is re-oriented. In some embodiments, the network device 102 generates an AR environment by generating an overlay for display over an OST display. In such embodiments, network device 102 may identify the location of objects visible via the OST display based on a wireless signal from such objects or based on a position of such objects stored in, for example, a database.

Figure 2:
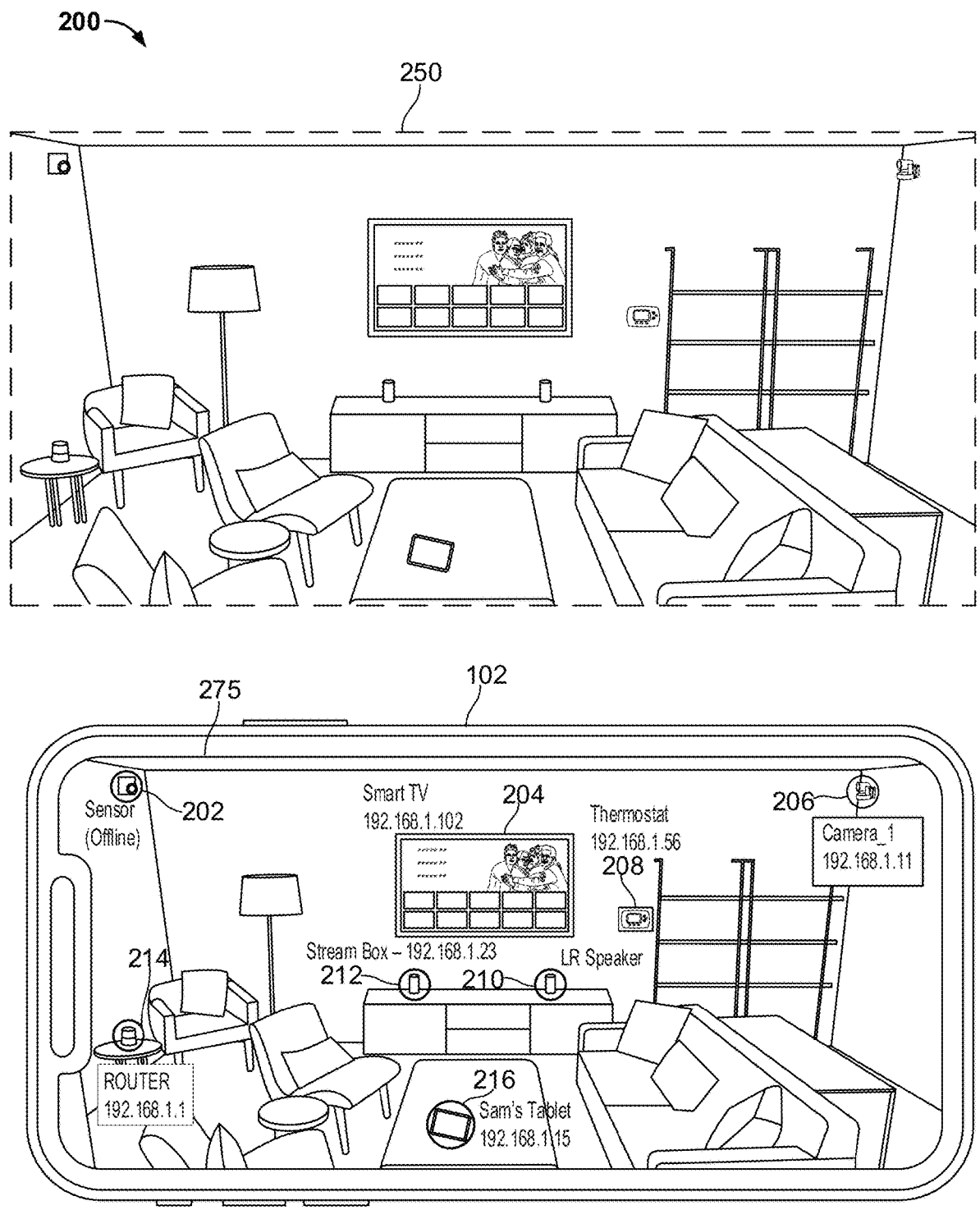
FIG. 2 shows an exemplary embodiment of an augmented reality environment for managing network devices, in an accordance with some embodiments of the present disclosure.

FIG. 2 depicts shows an exemplary embodiment of an augmented reality environment for managing network devices, in accordance with some embodiments of the present disclosure. Augmented reality system 200 depicts network device 102 displaying an image of an environment on display 104 (e.g., an image of environment 250 captured from camera 106). In some embodiments, the image of environment 250 is simply environment 250 as seen via a transparent or semi-transparent display (e.g., via a pair of smart glasses having a semi-transparent display). As referred to herein, the "image" may correspond to an environment as viewed through or via a transparent or semi-transparent display device. Augmented reality environment 275 is depicted augmenting environment 250 with identifiers (e.g., the boxes or circles) around devices identified by network device 102 within the environment. For example, as depicted in augmented reality environment 275, network device 102 may detect sensor 202, smart TV 204, camera 206, thermostat 208, speaker 210, stream box 212, router 214 and tablet 216 within the image captured of environment 250 and may display one or more indicators (e.g., a circle around the device and/or a device name) that indicate the position of an identified device. The devices depicted in environment 250 and augmented reality environment 275 are merely exemplary and any number and any type of device may be present without departing from the scope of the present disclosure. In some embodiments, the devices may comprise at least a portion of the circuitry depicted in exemplary network device in FIG. 8.

In some embodiments, network device 102 may detect the position of the one or more devices within environment 250 using a stereoscopic camera configuration as described above with respect to FIG. 1. For example, control circuitry 804 may detect a position of smart TV 204 relative to network device 102 by determining a disparity between pixels captured of smart TV 204 by two or more lenses of camera 106. In another example, network device 102 may determine the relative position of smart TV 204 using a LiDAR scanner of network device 102. For example, network device 102 may transmit a sequence of laser pulses and may measure a round trip time of the laser pulse. In some embodiments, network device 102 may utilize one or more combinations approaches to approximate a location of devices within environment 250, such as using a UWB radio as described below.

In some embodiments, network device 102 and/or each of the devices depicted in environment 250 (e.g., sensor 202, smart TV 204, camera 206, thermostat 208, speaker 210, stream box 212, router 214 and tablet 216) comprises one more wireless radios. For example, network device 102 and each of the devices depicted in environment 250 (e.g., sensor 202, smart TV 204, camera 206, thermostat 208, speaker 210, stream box 212, router 214 and tablet 216) may comprise one or more of a Wi-Fi radio, an UWB radio, a Bluetooth radio, a cellular radio, etc. For example, a first network device (e.g., any of the devices depicted in augmented reality environment 275, such as tablet 216) may comprise a first wireless radio (e.g., a UWB radio) and a second wireless radio (e.g., a Wi-Fi radio). In some embodiments, the second wireless radio (e.g., the Wi-Fi radio) of the first network device (e.g., tablet 216) may be used by the first network device to connect the first network device to a local area network (LAN) and/or a wide area network (WAN). In some embodiments, the connection to the LAN and/or WAN by the first network device may be made via one or more interstitial devices. For example, the first network device may connect to the LAN via a Wi-Fi access point, the Wi-Fi access point may be connected to one or more network switches, which may be connected to a network router that is connected to a WAN. An exemplary network configuration of devices is discussed further with respect to FIG. 9.

The first wireless radio (e.g., the UWB radio of tablet 216, such as UWB radio 818) may be used by the first network device (e.g., tablet 216) to transmit information about the first network device to other devices. For example, the first network device may utilize the first wireless radio for location discovery, device ranging, and/or for communication with other UWB enabled devices. In some embodiments, network device 102 (e.g., the second network device) comprises a UWB radio (e.g., the third wireless radio). When network device 102 enters a UWB range of tablet 216 (e.g., the first network device), the third wireless radio (i.e., the UWB radio of network device 102) may detect a signal from the first wireless radio (e.g., the UWB radio of tablet 216).

In response to detecting the signal, the second network device (e.g., network device 102) may determine, via the third wireless radio (e.g., the UWB radio of network device 102), a position of the first network device (e.g., tablet 216) relative to the second network device (e.g., network device 102). For example, when the first network device and the second network device come within range of one another, the two devices may begin a UWB ranging process to determine their relative locations and distances. In some instances, the second network device (e.g., network device 102) initiates the ranging process and in other instances the first network device (e.g., tablet 216) initiates the ranging process.

In some instances, the second network device (e.g., network device 102) may utilize two-way ranging to determine the relative position of the first network device. The second network device may utilize the timing of various signals sent between the first network device and the second network device to determine a position of the first network device relative to the second network device. For example, the first network device may transmit a signal (e.g., from the first wireless radio) comprising a poll message. The first network device may record a time of sending the poll message (TSP). When the second network device (e.g., network device 102) detects the signal, the second network device may record a time of receiving the poll message (TRP) and may transmit a response (e.g., via the third wireless radio) to the first network device (e.g., tablet 216). The second network device may record a time of sending the response message (TSR). When the first network device (e.g., tablet 216) receives the response message (e.g., at the first wireless radio), the first network device may record the time of receiving the response (TRR) and may transmit (e.g., via the first wireless radio) a final message. In some embodiments, the final message transmitted by the first network device may comprise a UWB identifier for the first network device, the TSP, the TRR, and a time of sending the final message (TSF). The second network device may receive the final message from the first network device at the third wireless radio (e.g., the UWB radio of network device 102).

After receiving the final message, the second network device will have timing information (e.g., TSP, TRP, TSR, TRR, and TSF) for the various messages (e.g., the poll message, the response message, and the final message). Using the timing information, the second network device may compute a time of flight for the signal between the first network device and the second network device. The second network device may determine the position of the first network device relative to the second network device at least partially based on the time of flight, in particular the second network device may determine a distance of the first network device relative to the second network device based on the time of flight.

In some embodiments, the third wireless radio of the second network device (e.g., the UWB radio of the network device 102) comprises one or more wireless antennas. By detecting the signal from the first network device (e.g., tablet 216) at each of the one or more wireless antennas, and computing a phase difference in the signal across the one or more wireless antennas, the second network device may compute an angle of arrival of the signal. Using the computed angle of arrival of the signal, the second network device may identify a direction of the first network device relative to the second network device. The second network device may utilize the information about the time of flight of the signal and the angle of arrival of the signal to approximate a position of the first network device relative to the second network device. In some embodiments, subsequent to identifying the position of the network device, the second network device may determine additional information about the network device, such as a name of the device, a network address, etc. as discussed further in detail below.

Although the exemplary two-way ranging process described above commences with the first network device transmitting a poll signal, the poll signal may be transmitted by the second network device without departing from the scope of the present disclosure. Additionally, other methods for computing a position of the devices may be used. For example, instead of or in addition to computing an angle of arrival for the signal, the second network device may work in conjunction with other UWB capable devices. For example, a router may also complete the two-way ranging protocol with the first network device and may share (e.g., by transmitting the results of the ranging via the UWB radio of the router) the results of the ranging with the second network device. Based on the combined results of the ranging by both devices, the second network device may approximate a more precise location for the first network device.

In some embodiments, the second network device may utilize other UWB ranging protocols, such as time difference of arrival (TDOA). Using such a protocol, multiple network devices may work in conjunction to each identify the location of a target device. For example, a third network device, such as a router, may compute a second time of flight of the signal between the first network device and the third network device and may share the second time of flight with a server and/or the second network device. Based on the first time of flight and the second time of flight, the second network device and or a server may determine a location for the first network device. In some embodiments, the third network device is an anchor device (e.g., a device having a fixed and/or know location) that works in conjunction with other anchor devices to compute and/or determine the locations of other devices. For example, a first anchor device (e.g., a router), a second anchor device (e.g., a thermostat) and a third anchor device (e.g., a sensor) may each have a fixed location and may share a time clock. Each of the anchor devices may detect a signal from the first network device and may share a time of flight (e.g., based on the synchronized time clock) and may determine the location of the first network device by triangulating the location of the first network device using a difference in the time of flight between the signals detected by each of the anchor devices. While the example herein is described with respect to determining the position of devices based on a UWB signal, any type of signal or other method or steps may be used. For example, a Bluetooth or Wi-Fi signal may be used to approximate the location of a device or a camera may be used to detect and approximate a location of a device.

In some instances, a wireless radio of the second network device may be used to identify a location of a device that lacks a wireless radio. For example, smart TV 204 may comprise a Wi-Fi radio but may not comprise a UWB radio. The user may move the second network device (e.g., network device 102) to a location of smart TV 204 and may perform a ranging routine with other network devices having fixed or know locations. For example, network device 102, while next to the location of smart TV 204, may complete a UWB ranging protocol with sensor 202, camera 206, thermostat 208, and/or router 214. Based on the position of network device 102 relative to signals transmitted by sensor 202, camera 206, thermostat 208, and/or router 214, network device 102 may compute and store a location for smart TV 204. Therefore, when the user returns to a different location within environment 250, network device 102 may approximate a location of smart TV 204.

In some embodiments, network device 102 may detect multiple devices within environment 250. For example, network device 102 may use an image processing algorithm as described above and may detect the presence and position of one or more devices within environment 250. In other instances, or in combination with the camera-based device detection as described above, network device 102 may detect the presence of multiple devices based on detecting one or more wireless signals. For example, environment 250 may comprise a third network device, such as router 214. The third network device may comprise a fourth wireless radio (e.g., a UWB radio) and a fifth wireless radio (e.g., a Wi-Fi radio). The third network device (e.g., router 214) may transmit a poll signal, as described above. When the second network device (e.g., network device 102) detects the signal from the UWB radio of the third network device (e.g., router 214), the second network device may determine a position of the third network device relative to the second network device by completing a UWB ranging protocol as described above. This example is intended to be exemplary and any number or combination of approaches (e.g., using a camera, using LiDAR, using a UWB radio, using a Bluetooth radio, etc.) may be used to detect a device and determine a position of the device within a user's environment (e.g., environment 250).

In some instances, the relative direction and the relative distance of a device may be stored by the second network device (e.g., network device 102). For example, network device 102 may store information about the position of the detected one or more devices within a database, such as the exemplary database 300 described further below with respect to FIG. 3A. In some embodiments, network device 102 may determine and store at least an identifier for a detected device (e.g., a UWB identifier for an identified device), a relative direction of the identified device (e.g., a normalized vector pointing in the direction of the detected device, where network device 102 is the origin) and a relative distance (e.g., a distance between network device 102 and tablet 216). In some embodiments, where the second network device determines additional information about the detected network device (e.g., a name of the network device or a network address of the network device), the second network device may additionally store such information in the database. The database may be stored locally (e.g., in storage of network device 102) or may be stored remote to network device 102 (e.g., on storage of router 214 or on a server located on a wide area network.

In some embodiments, the second network device may utilize the determined position of the one or more detected devices to display an indicator of the detected device within augmented reality environment 275, such as a circle around a detected device. For example, network device 102 may retrieve an image of environment 250 from camera 106 and may overlay the image with an indicator at the position within the image that corresponds to the relative position of the device (e.g., a circle around tablet 216). For example, using the vector representing the relative position of tablet 216 (e.g., within the Cartesian system depicted in FIG. 1A and FIG. 1B) and/or the distance of tablet 216 to network device 102, network device 102 may approximate a position of tablet 216 in the two-dimensional plane of the image (e.g., the image of environment 250). In another example, network device 102 may overlay an environment as seen via a transparent or semi-transparent display by identifying a position within the display that corresponds to the relative position of the device and may display the indicator at the relative position within the display (e.g., such that the overlay appears to circle the device within the transparent or semi-transparent display).

In some embodiments, network device 102 may select a number of indicators to display based on an amount of available free space within the image of environment 250 and/or within an available amount of space on the transparent or semi-transparent display viewing environment 250. For example, network device 102 may limit the number of indicators that are displayed when one or more indicators may overlap. In another example, network device 102 may limit the number of indicators displayed when the user is too far away from a network device. For example, when a smartwatch is in a background of an image, network device 102 may refrain from displaying the indicator for the smartwatch until network device 102 is closer to the smartwatch (e.g., until the smartwatch is more visible within the image). In another example, network device 102 may modify the appearance or style of the indicator based on the distance. For example, when a device is less than a threshold distance to network device 102 (or appears at least a threshold size within the image) network device 102 may display a first type of indicator (e.g., a circle around the device). When a device is greater than a threshold distance to network device 102 (or appears smaller than the threshold size within the image) network device 102 may display a second type of indicator (e.g., a line or arrow pointing to the device) or may display information about the device in a panel (e.g., one of the panels depicted in FIG. 4 or FIG. 6).

In some embodiments, as network device 102 moves around environment 250, augmented reality environment 275 is continually updated to continue displaying the indicators at their appropriate positions. For example, network device 102 may detect movement via an accelerometer, gyroscope, changed image from the camera, etc. In response to detecting the movement of the second device, the second network device may determine an updated position of the first network device relative to the second network device. For example, network device 102 may perform the UWB ranging protocol to identify an updated position for tablet 216. The second network device may modify a database entry based on the updated position. For example, the second network device may transmit the updated relative position to router 214 to store in database 300.

Figure 4:
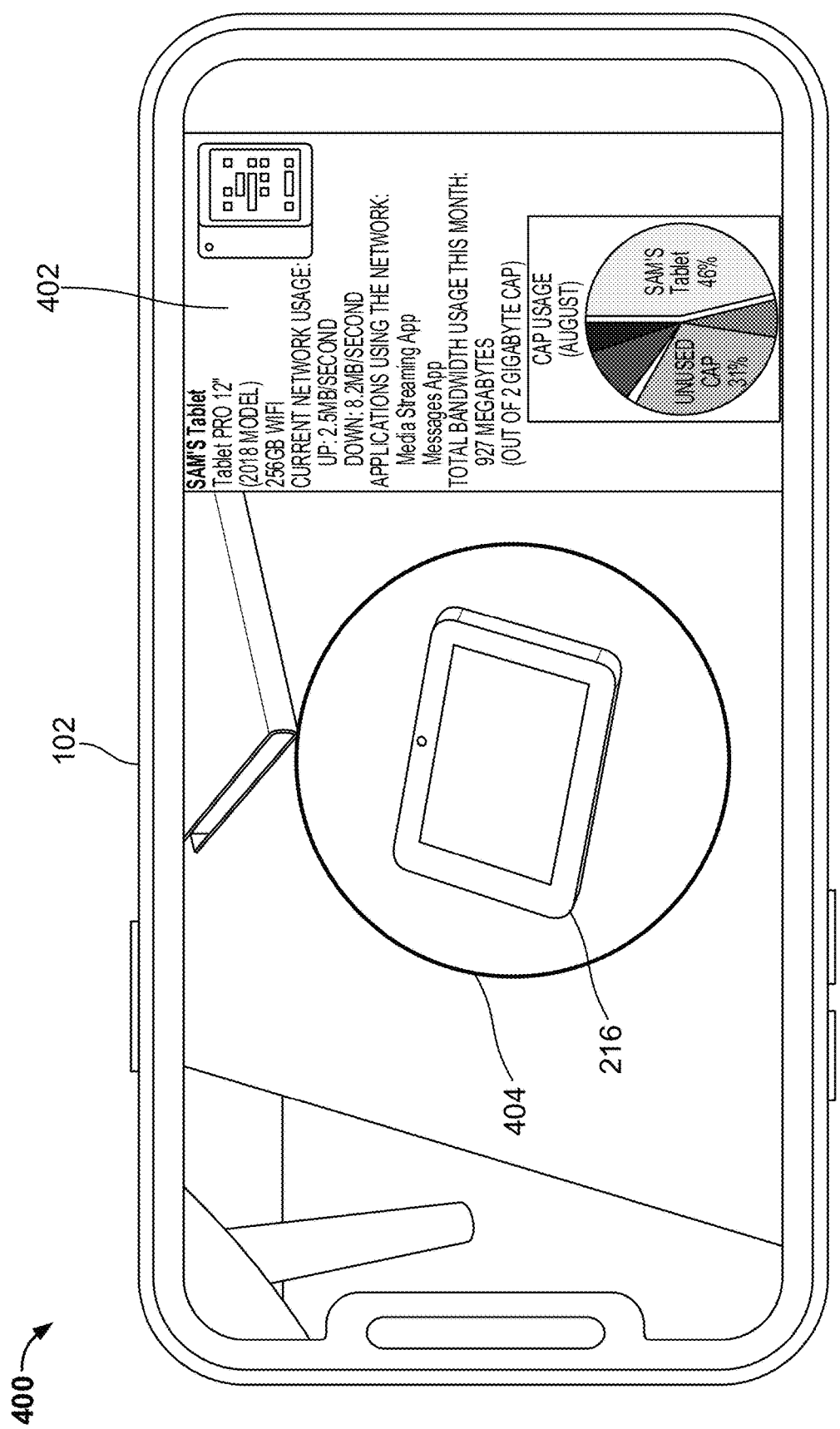
FIG. 4 shows an exemplary embodiment of a detailed view of information about a network device, in an accordance with some embodiments of the present disclosure.

In some embodiments, subsequent to determining the updated position, network device 102 may update a position of the overlays, indicators, text, etc. within augmented reality environment 275. For example, as a user network device 102 closer to tablet 216, the indicator around tablet 216 may enlarge as tablet 216 takes up additional screen space (e.g., as depicted in FIG. 4). In some embodiments, network device 102 may provide the user with an opportunity to pause augmented reality environment 275 such that when the user moves network device 102 augmented reality environment 275 is not updated (e.g., so that a user can select an object on screen or enlarge the display of augmented reality environment 275.

In FIG. 2, sensor 202, camera 206, speaker 210, stream box 212, router 214, and tablet 216 are each depicted by network device 102 in augmented reality environment 275 having a circular indicator. However, any indicator may be used. For example, thermostat 208 is depicted having a rectangular indicator. In some embodiments, the indicator may be an arrow pointing to a device, in other embodiments the indicator may be information placed proximate to the device (e.g., a device name and/or network address that is placed in the AR environment by network device 102 proximate to the device). Network device 102 may use edge detection to identify the outer limits of a detected device and may draw the indicator based on the detected edges. For example, the circle around tablet 216 in augmented reality environment 275 is selected such that it is slightly larger than tablet 216 as it appears in augmented reality environment 275. Likewise, the additional information about the device may be placed such that it overlays the device, or is placed outside of the perimeter of the device as it appears within augmented reality environment 275.

In some embodiments, network device 102 may graphically accentuate the detected device. For example, network device 102 may highlight the device within augmented reality environment 275 by applying a coloring (e.g., highlight) to the detected device or a border around the detected device. For example, network device 102 may use an edge detection algorithm to detect the perimeter of tablet 216 as it appears in augmented reality environment 275 and may display a highlighting around the border of tablet 216. The aforementioned methods for identifying a detected device within augmented reality environment 275 are merely exemplary and multiple different methods may be implemented without departing from the scope of the present disclosure.

In some aspects, the second network device may determine additional information about a detected device so that the second network device (e.g., network device 102) may display information about the device within augmented reality environment 275. For example, network device 102 may determine a name of sensor 202, smart TV 204, camera 206, thermostat 208, speaker 210, stream box 212, router 214, and/or tablet 216 and a network address of the devices so that network device 102 can display a name and/or the network address of each device proximate to its location within augmented reality environment 275. For example, the name for smart TV 204 (e.g., smart TV) and the network address (e.g., 192.168.1.102) may be displayed above smart TV 204 within augmented reality environment 275. In another example, a name for camera 206 (e.g., camera_1) and a network address (e.g., 192.168.1.11) may be displayed in a box below camera 206 within augmented reality environment 275. In some embodiments, network device 102 may determine the style to present the information based on objects that appear within the image. For example, network device 102 may present the information for router 214 in an opaque box when the objects behind the text would obscure the clarity of the text. In contrast, network device 102 may display the information for smart TV 204 in a transparent overlay when the background of the text will not obscure the clarity of the text.

In some embodiments, the second network device receives, from the first network device the name of the first network device (e.g., a name for tablet 216, Sam's Tablet) and a network address (e.g., 192.168.1.15) corresponding to the second wireless radio (e.g., the Wi-Fi radio of tablet 216, such as Wi-Fi radio 816). In some embodiments, the name and the network address are provided by the first network device subsequent to detecting the position of the first network device relative to the second network device (e.g., subsequent to completing the UWB ranging protocol). For example, in response to completing the UWB ranging protocol, the second network device (e.g., network device 102) may initiate a UWB communication session with the second network device (e.g., tablet 216). For example, the first network device may communicate via the first wireless radio (e.g., the UWB radio) with the third wireless radio (e.g., the UWB radio, such as UWB radio 818) of the second network device.

During the communication session, the first network device and the second network device may exchange unique tokens that identify each of the devices via the UWB physical layer data transport protocol. For example, the first network device (e.g., tablet 216) and the second network device (e.g., network device 102) may exchange UWB identifiers/addresses corresponding to each of the devices such that each device can communicate directly with each other over a UWB communications channel. By establishing the session, the first network device (e.g., tablet 216) and the second network device (e.g., network device 102) may transmit additional information about each of the devices and, in some embodiments, may bootstrap an additional connection via a different communication protocol. For example, over the UWB connection (or any other connection used to perform the ranging, such as Bluetooth) the first network device and the second network device may transmit information about an IP address and a MAC address used for a Wi-Fi or ethernet connection. For example, subsequent to exchanging IP addresses, the first network device may communicate with the second network device via the second wireless radio (e.g., the Wi-Fi radio) of the first network device over a Wi-Fi connection.

In some embodiments, during the session the first network device and the second network device may exchange some of the following information: a device identity (e.g., name, serial number, etc.), a network identity (e.g., an IP address, a MAC address, etc.), a device type (e.g., TV, tablet, PC, etc.), a device icon, a device descriptor (e.g., an XML file or CSV file comprising any information about the device, such as an OS version, hardware version, etc.), an identifier of services and capabilities of the device, physical attributes of the device (e.g., a screen size, device size, etc., which may be used to assist the AR rending). In some embodiments, the second network device stores the received information in a database, such as database 300, further in relation to FIG. 3A. When multiple devices are detected by the second network device (e.g., network device 102), network device 102 may retrieve device information for each of the detected devices. For example, when network device 102 detects sensor 202, smart TV 204, camera 206, thermostat 208, speaker 210, stream box 212, router 214, and/or tablet 216 in environment 250, network device 102 may retrieve information corresponding to each of sensor 202, smart TV 204, camera 206, thermostat 208, speaker 210, stream box 212, router 214, and/or tablet 216 and may store such information in database 300.

Although the abovementioned process for determining device attributes is described in relation to using a UWB radio, any protocol, method or process may be used without departing from the scope of the present disclosure. For example, the first network device and the second network device may use a Bluetooth connection to exchange device information.

In some embodiments, such a where a camera is used to detect the position of a device, network device 102 may determine the device information, by, for example scanning a QR code displayed on a device. For example, smart TV 204 may display a QR code to exchange the information or may have a QR code affixed to an exterior of Smart TV 204 (or any visual depiction comprising encoded information about smart TV 204, such as a barcode, machine readable text, etc.).

In some embodiments, network device 102 may use image processing techniques to determine that smart TV 204 is a television. In such embodiments, network device 102 may scan a local area network for televisions located on the local area network. When only one television is located on the local area network, network device 102 may determine that the network address for the device (e.g., smart TV 204)

is the address of the sole television located on the local area network. In response to detecting the network address, network device 102 may determine the name of the identified television by communicating using the network address (e.g., via Wi-Fi).

When multiple televisions are present, the multiple candidate network addresses (e.g., the network addresses corresponding to televisions) and/or candidate television names may be displayed. In some embodiments, when network device 102 cannot determine with certainty the identity of the device, network device 102 may display a prompt to request further user input in identifying the device. For example, control circuitry 804 may display a series of prompts to assist the user in selecting the correct network address from multiple candidate network addresses. For example, network device 102 may display a manufacturer and model of the television corresponding to each network address and may ask the user to confirm which TV appears in environment 250 based on the identified manufacturers and models of televisions on the local area network. Any methods or combination of methods may be used to identify information about the detected devices without departing from the scope of the present disclosure.

In some embodiments, the second network device may generate for display an overlay at a position of a detected device. For example, network device 102 may generate for display an overlay in augmented reality environment 275 comprising the identifier (as discussed above) and any of the information retrieved from the first network device, such as the name of the first network device (e.g., Sam's Tablet) and a network address corresponding to the second wireless radio (e.g., the Wi-Fi radio of tablet 216). By displaying a name of a detected device (e.g., Sam's iPad), and a network address (e.g., the IP address on the Wi-Fi network), a user may more easily identify and troubleshoot network issues. The overlays depicted in augmented reality environment 275 are merely exemplary and any information may be included in the overlay, including various information about the device (e.g., a device type and OS) and/or various network information corresponding to the device (e.g., a bandwidth being consumed by the device or a Wi-Fi signal strength). In some embodiments, the information displayed in the overlay is retrieved from a local and/or remote database (e.g., from database 300 or database 350), may be retrieved from the device itself (e.g., information about tablet 216 may be retrieved over a UWB connection with tablet 216), and/or may be retrieved from a third device (e.g., information about tablet 216 may be retrieved from router 214).

The overlay may take various forms. For example, network device 102 may generate for display the overlay so that it is centered over the position of the first network device within augmented reality environment 275. In another example, the overlay may be positioned proximate to the detected device (e.g., around a perimeter of the device without obscuring the device. In yet another example, the information may be displayed in response to a user action. For example, the information may be displayed in response to receiving a user selection of an identified device within augmented reality environment 275. For example, the user may select tablet 216 from augmented reality environment 275 displayed on network device 102 to cause network device 102 to display the information about tablet 216.

In some embodiments, network device 102 may limit a number of displayed overlays as to prevent the overlays from obscuring more than a threshold percentage of the augmented reality environment 275. For example, network device 102 may determine a number of overlays to display based on the number of detected devices within environment 250. For example, when five devices are detected, network device 102 may display five overlays each corresponding to a different device when the overlays will not obscure more than a threshold percentage of augmented reality environment 275. In some embodiments, network device 102 may select which overlays to display based on prominence of the devices within environment 250. For example, network device 102 may display an overlay for the two most prominent devices within environment 250 (e.g., for smart TV 204 and tablet 216 because those devices occupy the largest number of pixels within augmented reality environment 275).

In some aspects, the second network device may visually distinguish a network device based on a capability or characteristic of the network device. For example, the second network device (network device 102) may detect that the third network device (e.g., router 214) comprises a wide area network ("WAN") connection. For example, the second network device may determine that a network connection of the third network device is associated with a public IP address (e.g., that router 214 has a WAN port that is assigned a public IP address). In response to determining that the third network device comprises a WAN connection, the second network device may visually distinguish the third network device (e.g., router 214) from the first network device (e.g., tablet 216). For example, the second network device may highlight router 214 in a different color than tablet 216 and may place an icon next to router 214 to indicate that router 214 routes connections to the Internet.

FIGS. 3A and 3B depict exemplary databases in accordance with some embodiments of the present disclosure. Database 300 is an exemplary database that may be used by network device 102 for storing the relative location of devices within an environment (e.g., environment 250) and/or information about each of the detected devices (e.g., each of sensor 202, smart TV 204, camera 206, thermostat 208, speaker 210, stream box 212, router 214, and/or tablet 216). In some embodiments, network device 102 may create a new entry in database 300 for each device within environment 250 (e.g., eight entries). In some embodiments, database 300 is stored locally to network device 102 (e.g., on storage of network device 102) and/or remote to network device 102 (e.g., on router 216 or on a server accessed over a WAN connection). In some embodiments, network device 102 may select one of multiple storage locations based on a latency of accessing a particular storage. For example, network device 102 may store information in a local database when network device 102 expects to need quick access to such information and may store the information in a remote database when quick access is not needed. For example, network device 102 may store the position of tablet 216 within augmented reality environment 275 (e.g., an X and Y coordinate corresponding to pixels on display 104) on local storage so that network device 102 may quickly render information at the position of tablet 216 within augmented reality environment 275. In contrast, network device 102 may store the OS version of tablet 216 on remote storage (e.g., storage of router 214) because the OS version of tablet 216 may be accessed less frequently.

In some embodiments, database 300 may comprise a plurality of fields. A first field may store an identifier for a device. In exemplary database 300, the identifier is a UWB identifier such as a hardware address for the UWB radio of a device. For example, when the second network device (e.g., network device 102) detects the first network device (e.g., tablet 216), the second network device may store a hardware identifier of the first wireless radio (e.g., the hardware address of the UWB radio of tablet 216). Any identifier for the device may be used without departing from the scope of the present disclosure, such as a randomized identifier, a device serial number, a device name, a hash value of device characteristics, etc.

In some embodiments, the second network device may store a relative position of the first network device. For example, network device 102 may store the relative position of tablet 216 by storing a vector having the relative direction of tablet 216 and by storing a relative distance of tablet 216. While database 300 depicts the relative position as occupying two fields, any number of fields may be used and may vary based on the relative position representation. For example, when using a Cartesian coordinate system, the relative position may occupy four fields of the database—one field for each of the X, Y, and Z vector components and one field for the distance. When using a spherical coordinate system three fields may be used, one for the radial distance, one field for the polar angle, one filed for the azimuthal angle.

In some embodiments, the second network device may store information about additional wireless radios of the first network device. For example, the second network device may store information about the second wireless radio (e.g., the Wi-Fi radio) of the first network device, such as a LAN IP address, a MAC address, a Wi-Fi frequency, a Wi-Fi standard, etc. To prevent overcomplicating the drawing, only the LAN IP address for the second wireless radio is depicted in database 300.

In some embodiments, the second network device may receive additional information about the first network device and may store such information in a database (e.g., database 300) in one or more fields. For example, the second network device may receive a device identity (e.g., name, serial number, etc.), a device type (e.g., TV, tablet, PC, etc.), a device icon, a device descriptor (e.g., an XML file or CSV file comprising any information about the device, such as an OS version, hardware version, etc.), an identifier of services and capabilities of the device, physical attributes of the device (e.g., a screen size, device size, etc.). In some embodiments, when the second network device (e.g., network device 102) is rendering augmented reality environment 275, the second network device may access database 300 to retrieve relative position information and/or information about a detected device (e.g., tablet 216) to display in an overlay.

In some embodiments, the second network device may add additional information to database 300 to store tracking or other information related to the devices. For example, when the first network device is assigned a data cap or a bandwidth limit (discussed further below), network device 102 may store the data cap or bandwidth limit in database 300. In another example, network device 102 may maintain and update bandwidth usage of the first network device by storing and updating a bandwidth usage field of database 300 corresponding to tablet 216.

In some embodiments, the systems and methods presented herein track and/or monitor network activities of the devices. Parameters of the tracked network activities, such as a source address, destination address, service characterization, bandwidth, etc., may be stored in a database, such as database 350. For example, database 350 may store information about network traffic originating from or destined for network device 102, sensor 202, smart TV 204, camera 206, thermostat 208, speaker 210, stream box 212, router 214, and/or tablet 216. In some embodiments, database 350 stores information about network traffic exceeding a certain data threshold (e.g., network traffic exceeding 0.5 MB/S), such as a video stream, a download, a VOIP call, etc. but does not store information about smaller or intermittent network traffic (e.g., a call to a network time protocol "NTP" server).

In some embodiments, a router, such as router 214 manages and maintains database 350. In such instances, database 350 may be stored locally to router 214 (e.g., on storage circuitry 808 of router 214), a server remote to router 214 (e.g., on storage circuitry 808 of a server accessed via the Internet), or storage of another device (e.g., a computer located on the LAN). For example, as router 214 routes traffic within the LAN and to the WAN, router 214 may monitor the network traffic to identify parameters of the network activity such as a source address, a destination address, a service characterization, an application corresponding to the network activity, a network usage, a priority, a duration, an access time, a network cap, etc. Upon detecting the network characteristics, router 214 may update database 350 to include the characteristics. For example, router 214 may store the metrics corresponding to the parameters locally or may transit the metrics to the remote server.

In some embodiments, network device 102 maintains database 350 based on information received and/or detected by network device 102 about the network traffic. For example, the second network device (e.g., network device 102) may query the first network device (e.g., tablet 216) for information about current or past network activities of the first network device. In response to receiving the information about the network activities, network device 102 may store the information in database 350. In some aspects, the applications installed on the first network device may report the network activity to a remote server (e.g., server accessed over the Internet). In such instances, the remote server may maintain database 350 and network device 102 may retrieve information about the network activity by transmitting queries to database 350 on the remote server.

In some embodiments, the information stored in database 350 is used by network device 102 and/or router 214 in conjunction with information stored in database 300. For example, when the first network device is assigned a data cap, network device 102 and/or router 214 may utilize the information network traffic information of database 350 to update a bandwidth usage of tablet 216 stored in database 300.

In some embodiments, the second network device may retrieve information from database 300 and/or database 350 to present information in augmented reality environment 275. FIGS. 4-7 depict exemplary embodiments of displaying information about devices (e.g., sensor 202, smart TV 204, camera 206, thermostat 208, speaker 210, stream box 212, router 214, and/or tablet 216) and about network activities corresponding to each of the devices. The depictions in such figures are meant to be exemplary and not limiting. Any type of data, characteristic, and/or parameter of a network activity, status of a parameter of a network activity may be captured and/or stored and displayed within an augmented reality environment (e.g., by using or including such status, data, characteristic and/or parameter in a user interface (UI) element mapped to and displayed within the augmented reality environment). In some embodiments, user actions may be performed prior to displaying information about the devices and/or the data, characteristic, and/or parameters. In some embodiments, the UI elements allow for the user to control various parameters of devices and/or of network activities.

FIG. 4 depicts exemplary embodiment of a detailed view of information (e.g., detailed information view 400) about a network device (e.g., tablet 216), in an accordance with some embodiments of the present disclosure. For example, as a user moves network device 102 closer to tablet 216 within environment 250, network device 102 may determine an updated relative position of tablet 216 and, based on the updated position, may enlarge indicator 404 around tablet 216. In some embodiments, the enlarging of the indicator 404 is based on an image processing algorithm that tracks the edges of tablet 216 within the image such that indicator 404 is encompasses an entirety of tablet 216 may enlarge as tablet 216 takes up additional screen space (e.g., as depicted in FIG. 4). In some embodiments, indicator 404 is scaled and sized based on a relative distance from network device 102 to tablet 216 and a known size of tablet 216.

In some embodiments, the second network device may cause the display of a detailed information view in response to detecting that a distance between the second network device and the first network device is less than a threshold distance. For example, when network device 102 is less than one foot away from tablet 216, network device 102 generates the display of detailed information view 402 on display 104.

In some aspects, the second network device causes to be displayed detailed information view 402 in response to detecting that the first network device is centered within display 104 and/or occupies a threshold percentage of display 104. For example, when tablet 216 is located approximately centered within display 104 and occupies at least 10% of the pixels corresponding to display 104, network device 102 may cause to be displayed detailed information view 402.

The second network device may cause to be displayed detailed information view 402 in response to determining that the first network device is the only device within a field of view of camera 106. In another embodiment, the second network device causes to be displayed detailed information view 402 in response to detecting a user interaction with the first network device, such as a selection of an overlay or other identifier corresponding to the first network device within augmented reality environment 275 (e.g., selection of a highlighted region over tablet 216 or selection of the text "Sam's Tablet"). The aforementioned ways that the second network device may initiate the display of detailed information view 402 are merely exemplary and any other ways of triggering the detailed information view may be used without departing from the scope of the present disclosure.

In some embodiments, a position of detailed information view 402 within the augmented reality environment is selected based on a position of the device within the augmented reality environment. For example, network device 102 may choose to render the display of the detailed information view 402 to the right of tablet 216 so that tablet 216 is not obscured by detailed information view 402. In other embodiments, the position of detailed information view 402 may be selected such that it overlays the network device (e.g., tablet 216).

Detailed information view 402 is depicted having detailed information about tablet 216 and information about network activities of tablet 216. In some embodiments, prior to causing the display of detailed information view 402, network device 102 retrieves information about network device 102 from database 300 and/or database 350. For example, network device 102 may retrieve a name of tablet 216 (e.g., Sam's Tablet), model information (e.g., Tablet Pro 12" (2018 Model), an icon for the device, device characteristic (e.g., 256 GB of storage and Wi-Fi), current network usage (e.g., 2.5 MB/s up and 8.2 MB/s down), a listing of applications using the network (e.g., Media Streaming App, Messages App), a total bandwidth usage this month (e.g., 927 MB), a bandwidth cap (e.g., 2 GB), etc.

Subsequent to receiving the information, network device 102 may generate additional information about the device or may augment the information with additional data received from other devices. For example, network device 102 may augment the data by generating a pi chart based on the received total bandwidth usage and the bandwidth cap. In another example, network device 102 may retrieve additional information to display in detailed information view 402 from the Internet. For example, network device 102 may utilize the model information and/or device characteristics of tablet 216 to retrieve an icon for tablet 216 and may display the icon in detailed information view 402. In another embodiment, network device 102 may infer the application corresponding to a network activity by, for example examining the network activity to see whether an application is indicated within the network activity and or by identifying a server corresponding to an origin or destination address of the network activity and identifying an application corresponding to the serve.

Detailed information view 402 is intended to be exemplary of a detailed view of information that the second network device may display in an augmented reality environment (e.g., augmented reality environment 275) and is not intended to be limiting. For example, detailed information view may comprise additional information not depicted in detailed information view 402, may be scrollable, may comprise buttons or other actionable interface items, etc. For example, detailed information view may comprise buttons to modify the bandwidth and/or data cap of tablet 216.

Figure 5A:
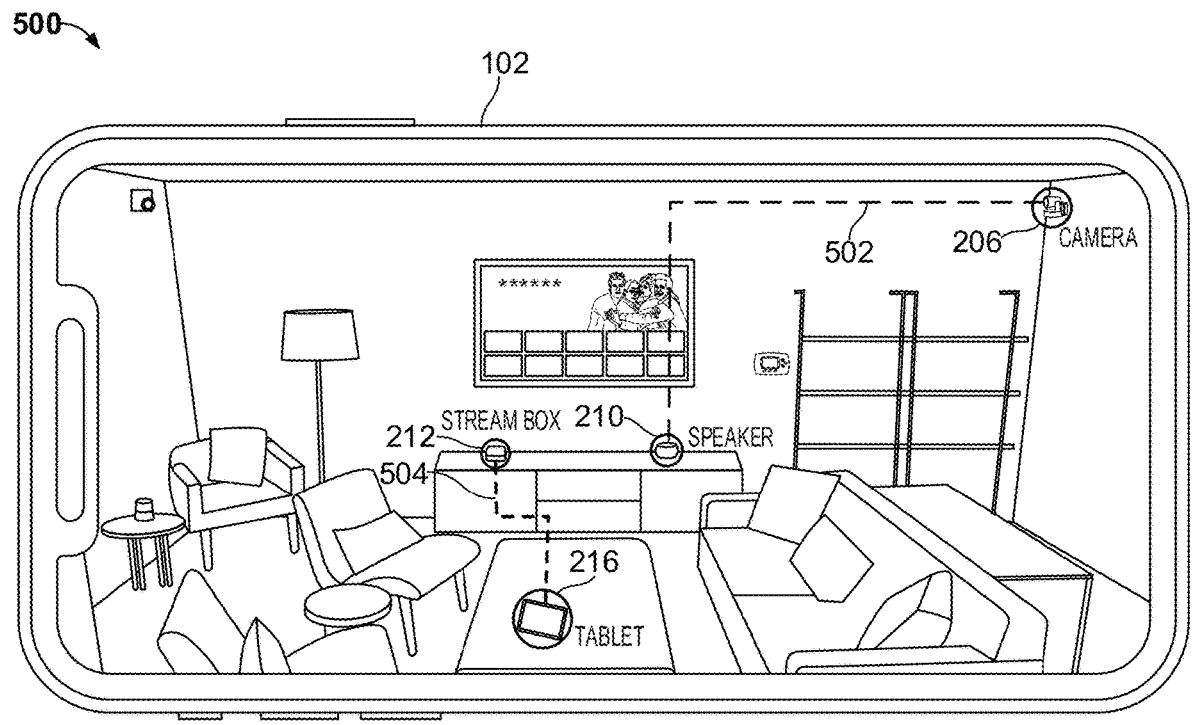
FIG. 5A shows an exemplary embodiment of a user interface (UI) element representing a connection between multiple network devices, in an accordance with some embodiments of the present disclosure.

FIG. 5A shows an exemplary embodiment of a UI element representing a connection between multiple network devices, in an accordance with some embodiments of the present disclosure. As discussed above, a device (e.g., router 214 or network device 102) may monitor the network activity of devices on a network and may store information about the network activity in database 300 and/or database 350. In some embodiments, the second network device may display a UI element representing a connection between devices in the augmented reality environment (e.g., augmented reality environment 275) to indicate when two devices are communicating with each other, as depicted in exemplary connection view 500. For example, when the second network device determines that the streaming box (e.g., stream box 212) and the tablet (e.g., tablet 216) are communicating with each other, network device 102 may display a UI element representing a connection (e.g., connection 504) between stream box 212 and tablet 216 within augmented reality environment 275. When the second network device (e.g., network device 102) determines that camera 206 is communicating with speaker 210, the second network device may display connection 502 between camera 206 and speaker 210.

For example, network device 102 may access database 350 and may identify network traffic that is both originating from and destined to devices within environment 250. For example, network device 102 may identify the network addresses (e.g., IP addresses) of all devices within environment 250 and may filter database entries in database 350 based on the network addresses. When network device 102 determines that two devices are communicating with each other (e.g., a network activity has an origin IP address corresponding to tablet 216 and a destination of the network activity has a destination IP address corresponding to stream box 212), network device 102 may generate within augmented reality environment 275 a connection between the two devices (e.g., connection 504).

In some embodiments, a size of the UI element representing the connection is based on a parameter of the network activity, such as a bandwidth. The bandwidth of the network activity may be retrieved by network device 102 from database 350. For example, connection 504 may be displayed wider than connection 502 when a bandwidth of a network activity between stream box 212 and tablet 216 is larger than a bandwidth of a network activity between camera 206 and speaker 210. Network device 102 may adjust the width dynamically as the bandwidth of the network activity changes. For example, when a bandwidth of the network activity between stream box 212 and tablet 216, network device 102 may automatically decrease the width of connection 504.

In some embodiments, network device 102 may modify a display characteristic of the UI element representing the connection between the devices based on a parameter of the network activity. For example, network device 102 may display an arrowhead on connection 504 near stream box 212 when tablet 216 is uploading more data to stream box 212 than it is receiving. In some embodiments, the displayed connection (e.g., connection 502 or connection 504) may have multiple additional connections. For example, connection 502 may comprise a first connection to depict an upload network activity and may comprise a second connection to depict a download network activity.

In some embodiments, network device 102 may animate the UI element representing the connection between the devices based on a parameter of the network activity. For example, network device 102 may display a flowing animation (e.g., using dots, bars, colors, etc.) from tablet 216 to stream box 212 to depict a flow of data from tablet 216 to stream box 212. The direction of the flow may be based on a determination, by network device 102, that more data is being transferred to stream box 212 by tablet 216 than stream box 212 to tablet 216 (e.g., by accessing the data stored in database 350). In some embodiments, the system may pulse the UI element (e.g., connection 504) based on a network parameter. For example, connection 504 may pulse based on a bandwidth corresponding to the network activity between stream box 212 and tablet 216. In another example, network device 102 may display static or noise around the connection to indicate that the signal is experiencing poor connectivity.

In some embodiments, network device 102 may indicate a parameter of the network activity based on a color of the UI element. For example, when a signal strength between tablet 216 and stream box 212 is weak, network device 102 may display the UI element (e.g., connection 504) in a red color, whereas the connection may be displayed in a green color when the signal strength is excellent. In some embodiments, the color may be based on other network parameters, such as an error/retransmit rate.

In some embodiments, the UI element is displayed such that it appears as if it exists in a three-dimensional augmented reality environment. For example, when stream box 212 is located farther away from tablet 216, relative to network device 102, the connection may taper such that a terminal end of connection 504 that is closer to stream box 212 appears smaller than a terminal end of connection 504 to tablet 216. In some embodiments, drop shadows may be used to enhance the effect that connection 504 exists in augmented reality environment 275.

In some embodiments, the UI element may be user selectable so that the user may view additional information about the network activity corresponding to the connection. For example, network device 102 may detect a user touch input on connection 504 and in response to detecting the user touch input may display details about the network activity between stream box 212 and tablet 216, as discussed further below.

Figure 5B:
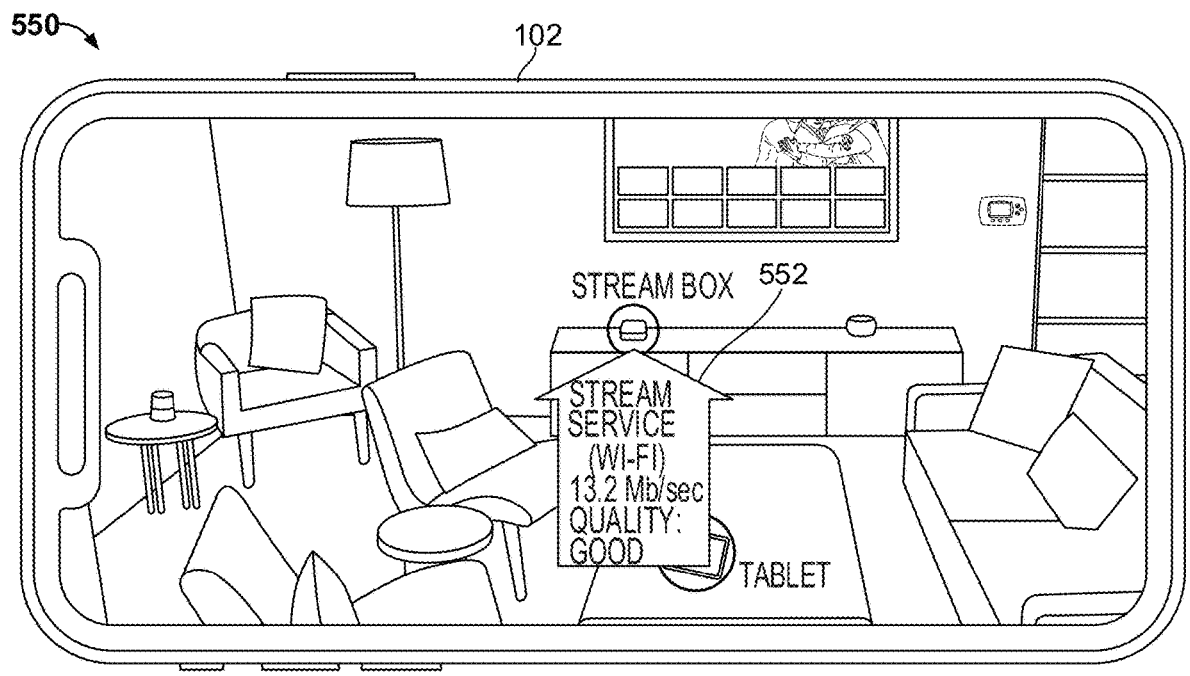
FIG. 5b shows an exemplary embodiment of an UI element indicating a network activity between devices, in accordance with some embodiments of the present disclosure.

FIG. 5b shows an exemplary embodiment (e.g., exemplary detailed connection view 550) of a UI element (e.g., UI element 552 indicating details of a network activity) indicating details of a network activity between devices, in accordance with some embodiments of the present disclosure. In some embodiments, network device 102 may automatically display UI element 552 in response to detecting the user approaching the devices that are involved in the network activity. For example, when the network activity is between stream box 212 and tablet 216, network device 102 may automatically generate the display of network activity overlay 522 in response to detecting that a distance between network device 102 and stream box 212 and/or tablet 216 has decreased (e.g., by using the UWB ranging protocol and/or accessing information in database 300). In another example, network device 102 may display UI element 552 in response to receiving a selection of any of the devices corresponding to a network activity (e.g., stream box 212 or tablet 216). In some embodiments, network device 102 pauses the updated rendering of augmented reality environment 275 while displaying UI element 552.

UI element 552 may comprise any information about the network activity and or about the devices engaging in the network activity. For example, UI element 552 may comprise information indicating a service corresponding to the network activity (e.g., "Streaming Service"), a connection being used to perform the network activity (e.g., Wi-Fi), a bandwidth of the network activity (e.g., 13.2 Mb/s), and quality of the wireless signal strength between the devices.

In some embodiments, network device 102 may generate information for including in UI element 552 and/or any other UI element, overlay, display, etc. to help a user diagnose network issues. For example, network device 102 may receive an indication of Wi-Fi signal strength as measured in dBm. However, many users may not be familiar with the measure of dBm so network device 102 may generate a user accessible indication of the signal strength by translating the dBm measure into something that is more easily understandable by the user (e.g., an indication of Excellent, Good, Bad, etc.).

The information depicted in UI element 552 is intended to be exemplary and not limiting, and any information may be included without departing from the scope of the present disclosure, such as any information stored in database 300 and/or 350, information from a server on the Internet, or any information retrieved from any network device (sensor 202, smart TV 204, camera 206, thermostat 208, speaker 210, stream box 212, router 214, and/or tablet 216.

Figure 6:
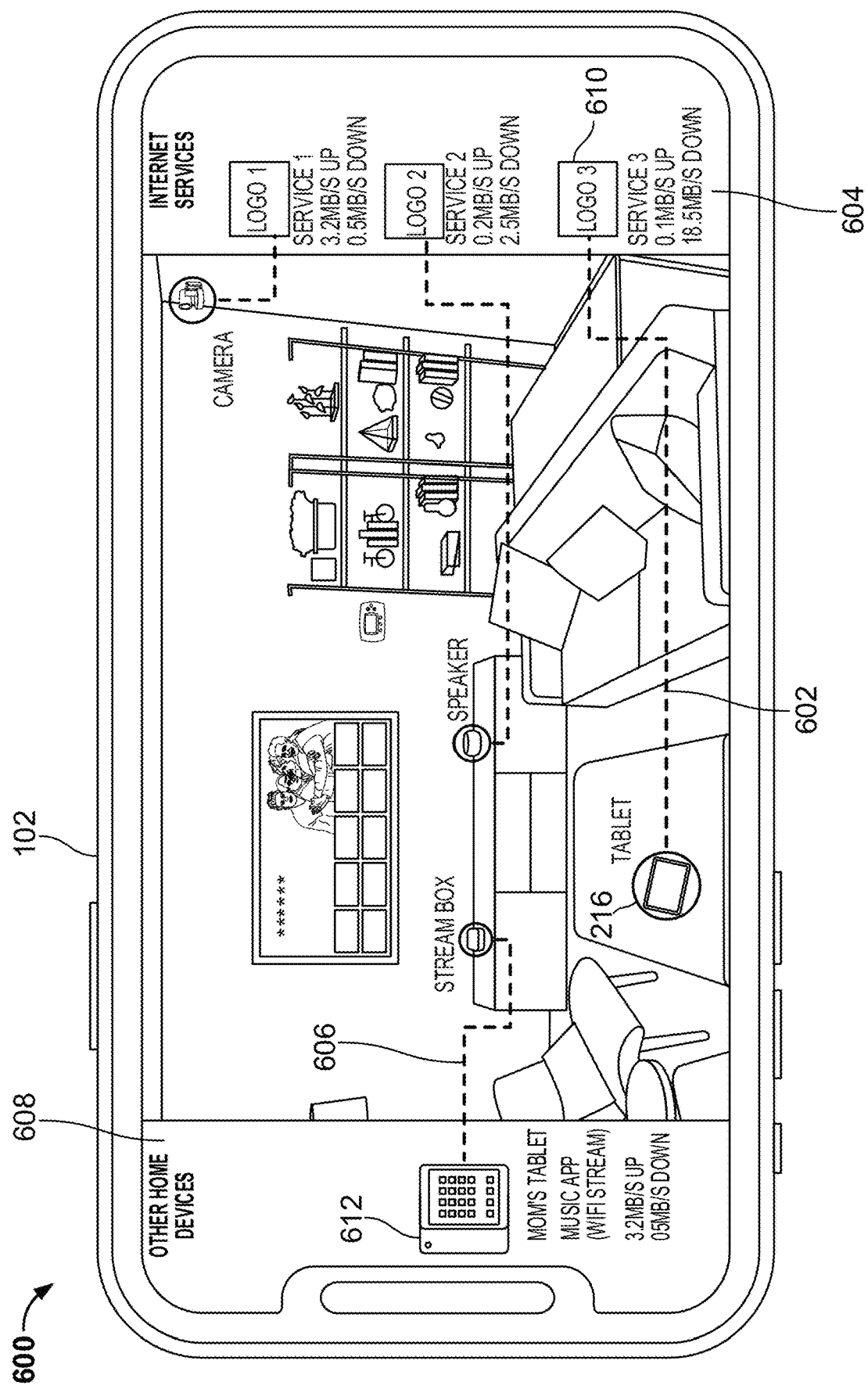
FIG. 6 shows an exemplary embodiment of a detailed view of network activities of multiple devices, in an accordance with some embodiments of the present disclosure.

FIG. 6 shows an exemplary embodiment of a detailed view of network activities of multiple devices (e.g., multi device view 600), in an accordance with some embodiments of the present disclosure. Multi device view 600 is depicted having two UI elements depicting devices and/or services that are not detected within environment 250, one for devices that are located within the home but are not within environment 250 (e.g., UI element 608), and one for devices that are located outside of the user's home (e.g., UI element 604) and or devices that are located in environment 250 but may not have a UWB radio and/or whose position was not detected using the camera or another method. Any number of UI elements and categorizations may be used without departing from the scope off the present disclosure. For example, one UI element may correspond to wired devices and/or services accessed via a wireless network.

UI element 604 is depicted having services that are located outside of the user's home. In some embodiments, network device 102 causes the display of UI element 604 in response to detecting that one or more devices detected within environment 250 are communicating with devices and/or services located outside of a user's home.

For example, network device 102 may detect that tablet 216 is communicating with a service or device outside of the home based on inspecting the network traffic of tablet 216 and determining that a destination IP address of the network activity is for a public IP address. Using the public IP address, network device 102 may determine a service to which tablet 216 is communicating. In other embodiments, network device 102 may receive an indication of the service and/or device from a database (e.g., database 300 and/or database 350) or from the device itself (e.g., an application running on tablet 216). In response to detecting the service and/or device, network device 102 may display a logo for the service and a name for the service in UI element 604 (e.g., because the service is located outside of the user's home). In some embodiments, network device 102 may display parameters of the network activity between tablet 216 and the service, such as an application corresponding to the network activity, a connection type (e.g., Wi-Fi), a bandwidth, etc.

Network device 102 may display a UI element, such as a connection, between tablet 216 and an identifier for the service (e.g., logo 610) to indicate in the augmented reality environment (e.g., augmented reality environment 275) that tablet 216 is communicating with an Internet based service (e.g., the service corresponding to logo 610). In some embodiments, network device 102 may animate, color, or otherwise modify connection 602 (as indicated above with respect to FIG. 5) to indicate information about the network activity between tablet 216 and the service corresponding to logo 610.

UI element 608 is depicted having devices that are located within the user's home, but are not detected (e.g., by network device 102) within environment 250. In some embodiments, network device 102 causes the display of UI element 608 in response to detecting that one or more devices detected within environment 250 (e.g., sensor 202, smart TV 204, camera 206, thermostat 208, speaker 210, stream box 212, router 214, and/or tablet 216) are communicating with devices and/or services located on a LAN, but are not detected in environment 250 (e.g., because the devices do not have a UWB radio and/or were not added to database 300.

For example, network device 102 may detect that stream box 212 is communicating with a service or device inside of the home (e.g., the corresponding to the logo of tablet 612) based on inspecting the network traffic of tablet 216 and determining that a destination IP address of the network activity is for a local IP address. Using the IP address, network device 102 may search database 300 to determine whether information about the device (e.g., tablet 612) is stored in database 300. For example, information about the device (e.g., tablet 612) may be stored in database 300 when network device 102 once detected the device but it is no longer present in environment 250 (e.g., because the device moved). In such embodiments, network device 102 may retrieve the information about the device from database 300 and may retrieve information about the network activity between the devices from database 350 and/or from the devices themselves (e.g., an application running on stream box 212 or tablet 612). In response to detecting the service and/or device, network device 102 may display a logo for the device and a name for the device in UI element 608 (e.g., because the device is located inside of the user's home but is not detected in environment 250). In some embodiments, network device 102 may display parameters of the network activity such as an application corresponding to the network activity, a connection type (e.g., Wi-Fi), a bandwidth, etc.

Network device 102 may display a UI element, such as a connection, between stream box 212 and the identifier of the tablet 612 to indicate in the augmented reality environment (e.g., augmented reality environment 275) that stream box 212 is communicating with another device on the local network that is not in environment 250 (e.g., "Mom's Tablet"). In some embodiments, network device 102 may animate, color, or otherwise modify connection 602 (as indicated above with respect to FIG. 5) to indicate information about the network activity between stream box 212 and tablet 612.

The information depicted in multi device view 600 is meant to be exemplary and not limiting. Any type of information about devices, network activities, etc. may be displayed using a variety of methods, examples of which are described herein, without departing from the scope of the present disclosure.

Figure 7:
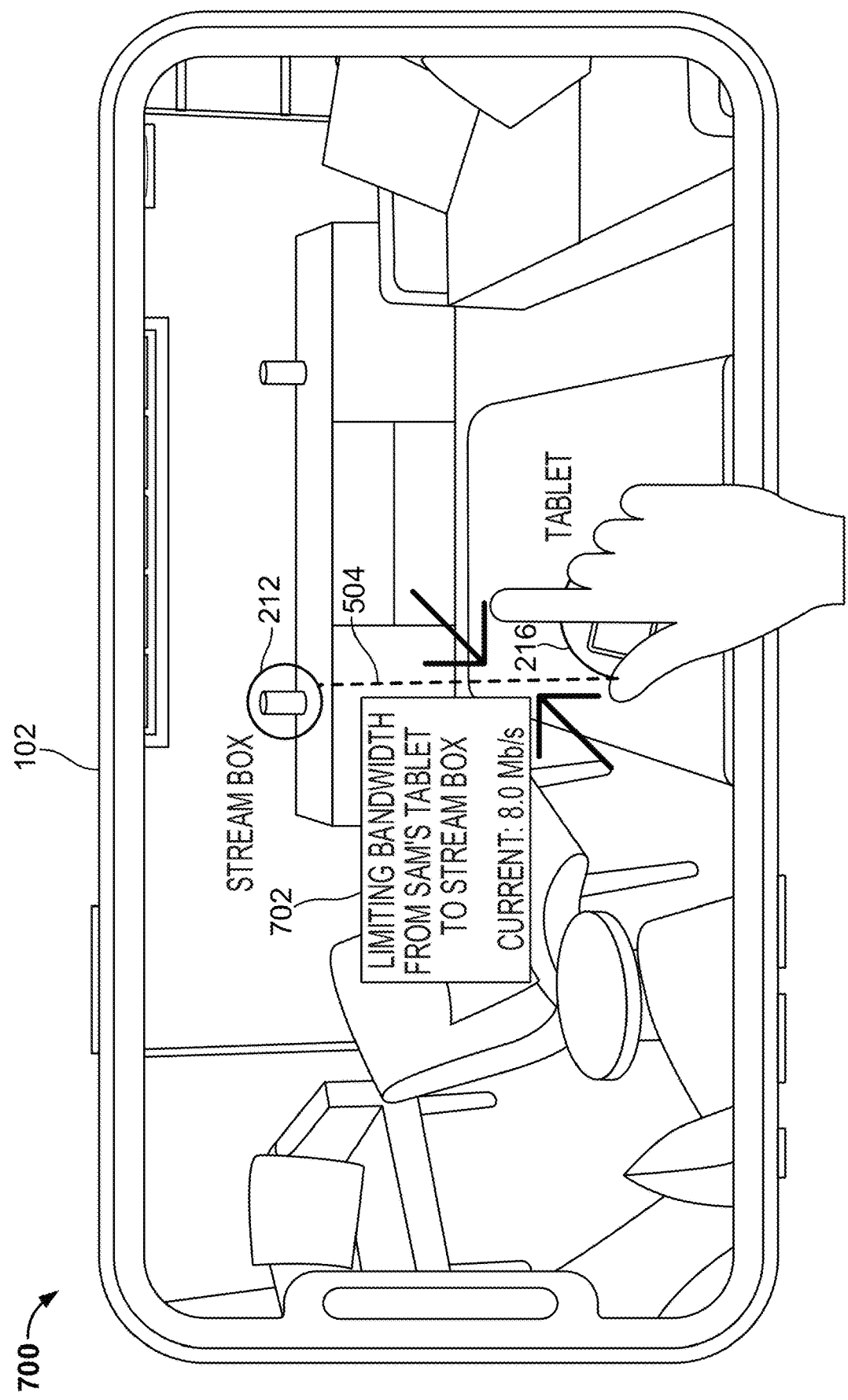
FIG. 7 shows an exemplary embodiment of controlling a network device using a gesture, in an accordance with some embodiments of the present disclosure.

FIG. 7 shows an exemplary embodiment of controlling a network device using a UI element, in an accordance with some embodiments of the present disclosure. In some embodiments, exemplary control interface 700 is depicted showing a user controlling an UI element in accordance to some embodiments of the present disclosure. The exemplary embodiment of controlling a device using an UI element is merely exemplary and other method of controlling various parameters of devices and/or parameters of network activities may be used without departing from the scope of the present disclosure.

In some embodiments, network device 102 may display a UI element (e.g., connection 504) between two devices that are communicating over a LAN. For example, network device 102 may allow a user to decrease a bandwidth of the network activity between tablet 216 and stream box 212 based on receiving a pinch in gesture on connection 504 and may allow a user to increase a bandwidth of the network activity based on receiving a pinch outward gesture on connection 504. For example, response to detecting a one or more touch points above connection 504 on display 104, network device 102 may track the location of the touch points. As network device 102 determines that the touch points are getting closer, network device 102 may determine that the user is decreasing the bandwidth of connection 504. When network device 102 determines that the touch points are getting farther away, network device 102 may determine that the user is increasing a bandwidth for the network activity.

In response to receiving the user input, the network device 102 may modify the parameter (e.g., bandwidth) of the network activity. For example, a device (e.g., router 214) may comprise control circuitry (e.g., control circuitry 804) configured control parameters of network activities. Network device 102 may transmit a request to router 214 comprising the request to control a parameter of a network activity between tablet 216 and stream box 212. For example, network device 102 may transmit a packet to router 214 comprising an identifier for tablet 216 and stream box 212 (e.g., an IP address, MAC address, or other device ID), a parameter to control (e.g., a bandwidth) and a value corresponding to the parameter (e.g., a maximum bandwidth of 8 Mb/s. In response to receiving the packet, the device (e.g., router 214) may update the parameter of the network activity. For example, in response to receiving the packet, router 214 may update a database entry corresponding to the network activity and/or tablet 216 and stream box 212 to reflect the bandwidth limit. Router 214 may enforce the bandwidth limit by throttling communication that occurs between the two devices that is routed through router 214. In some embodiments, the request by network device 102 may be routed through one or more intermediary devices, such as a network switch, over the Internet, over any of the devices depicted in environment 250, etc.

In some embodiments, changing the parameter of a first network activity (e.g., changing the bandwidth of a video stream) may come at an expense of a same parameter of a second network activity. For example, when network device 102 increases an amount of available bandwidth to tablet 216 and stream box 212 for the streaming activity, an amount of bandwidth for a streaming activity of smart TV 204 may be automatically decreased (e.g., by network device 102 requesting a decrease in the bandwidth or by router 214 automatically managing the bandwidth via, for example, quality of service settings.

In another example, the control of the network parameter may be handled by an application on one of the communicating devices (e.g., tablet 216 and stream box 212) and/or AR device (e.g., network device 102). For example, when the application is running on stream box 212, network device 102 may transmit the packet to stream box 212 and may control application layer parameters, such as a stream quality to cause the change of the parameter of the network activity.

In some embodiments, network device 102 may display a confirmation in response to updating the parameter of the network activity. For example, network device 102 may display overlay 702 confirming the new bandwidth of the network activity between stream box 212 and tablet 216. Overlay 702 may comprise an updated status of the parameter of the network activity (e.g., an updated value for the bandwidth). In some embodiments, overlay 702 is displayed while the user is modifying the bandwidth (e.g., performing the pinch) so that the user can more precisely set a desired bandwidth. In some embodiments, the size and/or color of the UI element (e.g., connection 504) while the user is performing the pinch action to more clearly indicate to the user the effect of the change in the parameter. In some embodiments, while network device 102 is attempting to change the parameter of the network activity the UI elements are displayed in a first manner and after confirming the change, the UI elements are displayed in a second manner. For example, while network device 102 is awaiting confirmation of the change in the parameter of the network activity (e.g., bandwidth), the UI element may flash. Once network device 102 confirms the change in the parameter of the network activity (e.g., the change in the bandwidth) the UI element may be displayed without flashing.

The user input with a UI element depicted in FIG. 7 is merely exemplary and not intended to be limiting. Other interactions with other UI elements may cause the modification of parameters of network activities or control devices, without departing from the scope of the present disclosure. For example, network device 102 may detect a swipe gesture corresponding to the UI element depicting the connection (e.g., connection 504) between tablet 216 and stream box 212. Based on receiving the swipe gesture, network device 102 may terminate the network activity between the two devices. For example, network device 102 may transmit a request to one or more applications running on tablet 216 or stream box 212 to terminate the network activity or network device 102 may transmit a request to router 214 to terminate the network activity. For example, in response to receiving the request, router 214 may block communications between tablet 216 and stream box 212 by dropping packets.

In some embodiments, network device 102 may detect a long press on a UI element (e.g., connection 504) to reveal more information about a network activity corresponding to the UI element. For example, when network device 102 detects a long press on connection 602, network device 102 may display a list of websites being access by tablet 216. A user may swipe or select another UI element to block access to the website, change a parameter of the network activity corresponding to the service/website, etc.

In some embodiments, network device 102 may display parent control setting for a device based on a detecting a user selection of the device and or UI element corresponding to the device (e.g., connection 602 or an indicator corresponding to tablet 216). Network device 102 may display parental control settings that allow a user to limit the bandwidth of a device, set allowed or denied websites (a user may select websites from a list of websites previously accessed by the device, retrieved from database 350), set time limits for when a device can access a LAN or WAN, set a bandwidth limit, set a network usage cap, block or allow specific applications, etc.

In some embodiments, network device 102 may allow a user to block a device from accessing a network by receiving a user input via a UI element. For example, a user can flick an indicator for a device downward to block the device from accessing the network. For example, when network device 102 detects that user flicking up a UI element corresponding to tablet 216, network device 102 may transmit to router 214 a request to remove tablet 216 from a RADIUS access control list of router 214. The request sent by network device 102 to router 214 may include, for example, a hardware address of the second wireless radio of the first device (e.g., MAC address for the Wi-Fi radio). In some embodiments, in response to blocking a device, network device 102 may display a UI element listing the blocked device(s) and or may display an icon over the device within augmented reality environment 275. For example, network device 102 may display a UI element such as UI element 608 and/or UI element 604 that is designated for blocked devices.

In some embodiments, network device 102 may allow a user to reset a network connection of a device by receiving a user input via a UI element. For example, a user can flick upwards an indicator for a device to reset a network connection for the device. For example, a user can flick an indicator for a device upward (e.g., a UI element corresponding to tablet 216) to reset a connection corresponding to the second wireless radio (e.g., the Wi-Fi radio of tablet 216). Network device 102 may transmit to router 214 a request to reset the network connection corresponding to the second wireless radio of tablet 216 by, for example, including a hardware address of the second wireless radio of the first device (e.g., MAC address for the Wi-Fi radio) and a request to drop the device's network address translation table (NAT) lease, thereby resetting the IP address of the device.

By enabling a user to identify devices within an augmented reality environment (e.g., augmented reality environment 275) network device 102 can limit the displayed available control options such that only options that correspond to a detected device are displayed. For example, only options corresponding to tablet 216 are displayed when the user selects tablet 216 in augmented reality environment 275. Accordingly, a user can easily identify and control devices within a network.

In some embodiments, network device 102 may display the status of a network activity involving itself. For example, network device 102 may display a UI element to indicate a parameter of a network activity, such as a signal strength between network device 102 and router 214. The indicator may be place, for example, in a top bar of augmented reality environment 275 or may be displayed in full screen. For example, while a user is walking around environment 250, display 104 may fill with static as the signal strength parameter of the network activity between network device 102 and router 214 decreases and become clear as the signal strength parameter of the network activity between network device 102 and router 214 increases.

Figure 8:
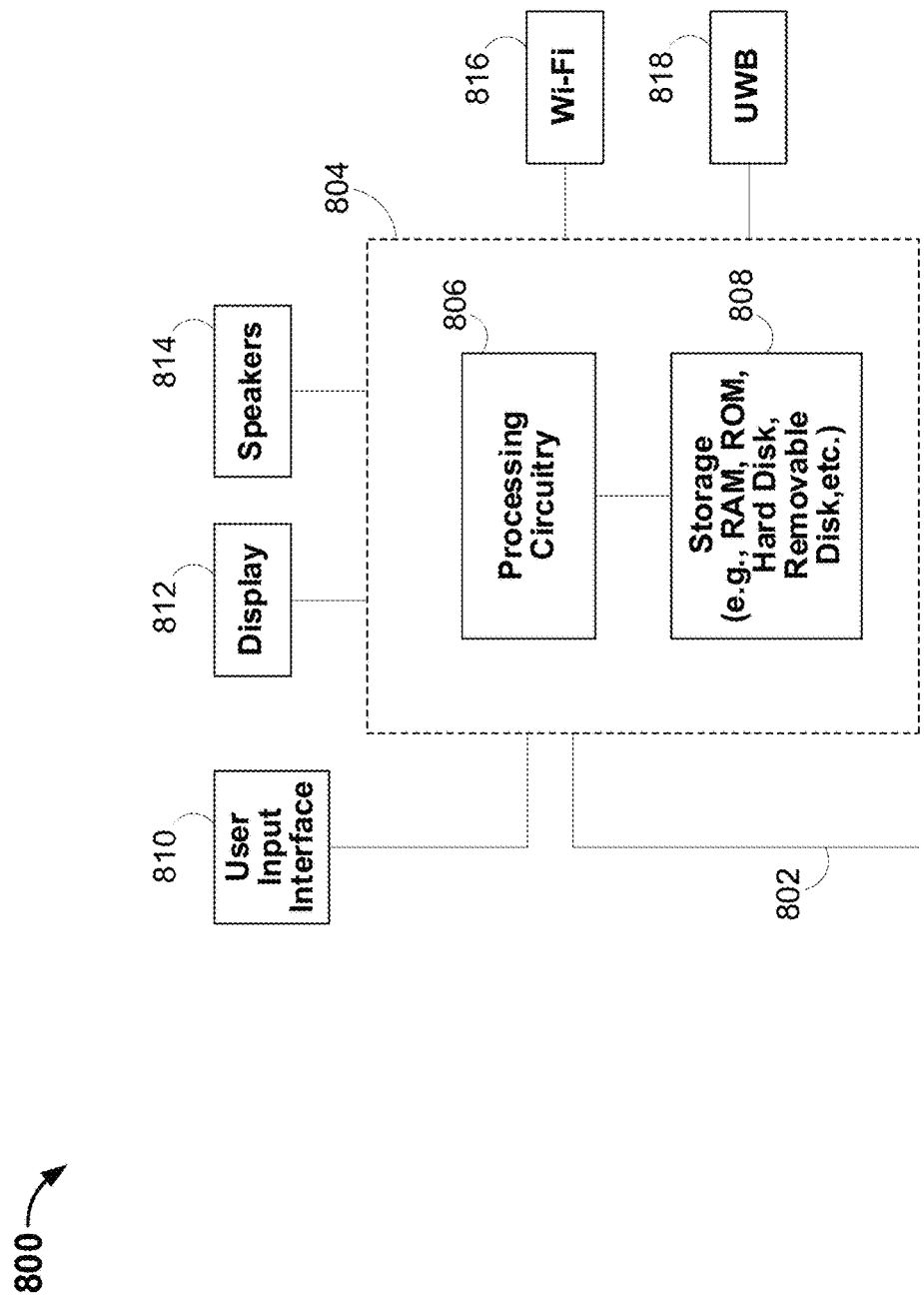
FIG. 8 shows an exemplary embodiment of a network device, in accordance with some embodiments of the present disclosure.

FIG. 8 shows an illustrative, generalized embodiment of illustrative device 800. Device 800 is depicted having components that are internal and external to device 800, for example, processing circuitry 806, storage 808, and communications circuitry, such as Wi-Fi radio 816 and UWB radio 818, which may each include one or more wireless antennas, input/output (hereinafter "I/O") interface 810, display 812, and communications path 802. In some embodiments, each of the devices described herein (e.g., network device 102, sensor 202, smart TV 204, camera 206, thermostat 208, speaker 210, stream box 212, router 214, and/or tablet 216) may comprise some or all of the components of device 800.

I/O interface 810 may provide content and data to control circuitry 804 and control circuitry 804 may be used to send and receive commands, requests, and other suitable data using I/O interface 810. I/O interface 810 may connect control circuitry 804 (and specifically processing circuitry 806) to one or more communications paths (e.g., Wi-Fi radio 816, UWB radio 818, path 802). I/O functions may be provided by one or more of these communications paths, that may be shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), GPUs, etc., and may include a multiple parallel processing cores or redundant hardware. In some embodiments, processing circuitry 806 may be distributed across multiple separate processors or processing units, for example, multiple of the same type of processors or multiple different processors. In some embodiments, control circuitry 804 executes instructions stored in memory (i.e., storage 808). Specifically, control circuitry 804 may be instructed to perform the functions discussed above and below. For example, network device 102 may provide instructions to control circuitry 804 to generate augmented reality environment 275 and control devices on a network (e.g., network device 102, sensor 202, smart TV 204, camera 206, thermostat 208, speaker 210, stream box 212, router 214, and/or tablet 216).

In some embodiments, control circuitry 804 may include communications circuitry (e.g., Wi-Fi radio 816 and/or UWB radio 818) suitable for communicating with other networks (e.g., a LAN or a WAN), servers (e.g., a server accessed via the Internet or databases 300, 350 and 910), or devices (e.g., network device 102, sensor 202, smart TV 204, camera 206, thermostat 208, speaker 210, stream box 212, router 214, and/or tablet 216). The instructions for carrying out the above-mentioned functionality may be stored on database 910. The communications circuitry may include a modem, a fiber optic communications device, an Ethernet card, or a wireless communications device for communicating with other devices. Such communications may involve the Internet or any other suitable communications networks or paths. In addition, communications circuitry may include circuitry that enables peer-to-peer communication between devices (e.g., using UWB radio 818).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, or any other suitable fixed or removable storage devices, and/or any combination of the same. Storage 808 may be used to store various types of data herein, such as instructions for performing the methods described herein, database 300, database 350 any statuses of parameters of network activities, and/or information about devices. Nonvolatile memory may also be used (e.g., to launch a boot-up routine and other instructions). Cloud-based storage (e.g., storage accessed via the Internet) may be used to supplement storage 808 or instead of storage 808.

A user may send instructions to control circuitry 804 using I/O interface 810 using an external device such as a remote control, mouse, keyboard, touch screen, etc. In some embodiments, control circuitry 804 correlates a user input with a location of a user interface element and performs an action based on the selected user interface element. Display 812 may be provided as a stand-alone device or integrated with other elements of device 800. For example, display 812 may be a touchscreen or touch-sensitive display and may be combined with I/O interface 810.

The system and methods described herein may be implemented using any suitable architecture. For example, it may be a stand-alone application wholly implemented on device 800. In such an approach, instructions of the application are stored locally (e.g., in storage 808). In some embodiments, the systems and methods described herein may be a client-server-based application. Data for use by a thick or thin client implemented on device 800 is retrieved on-demand by issuing requests to a server remote to the device 800. In some embodiments, the systems and methods provided herein are downloaded and interpreted or otherwise run by an interpreter or virtual machine (run by control circuitry 804). In some embodiments, some functions are executed and stored on one device and some are executed and stored on a second device. For example, network device 102 may display augmented reality environment 275 while router 214 controls a QoS and monitors and logs network activities.

Figure 9:
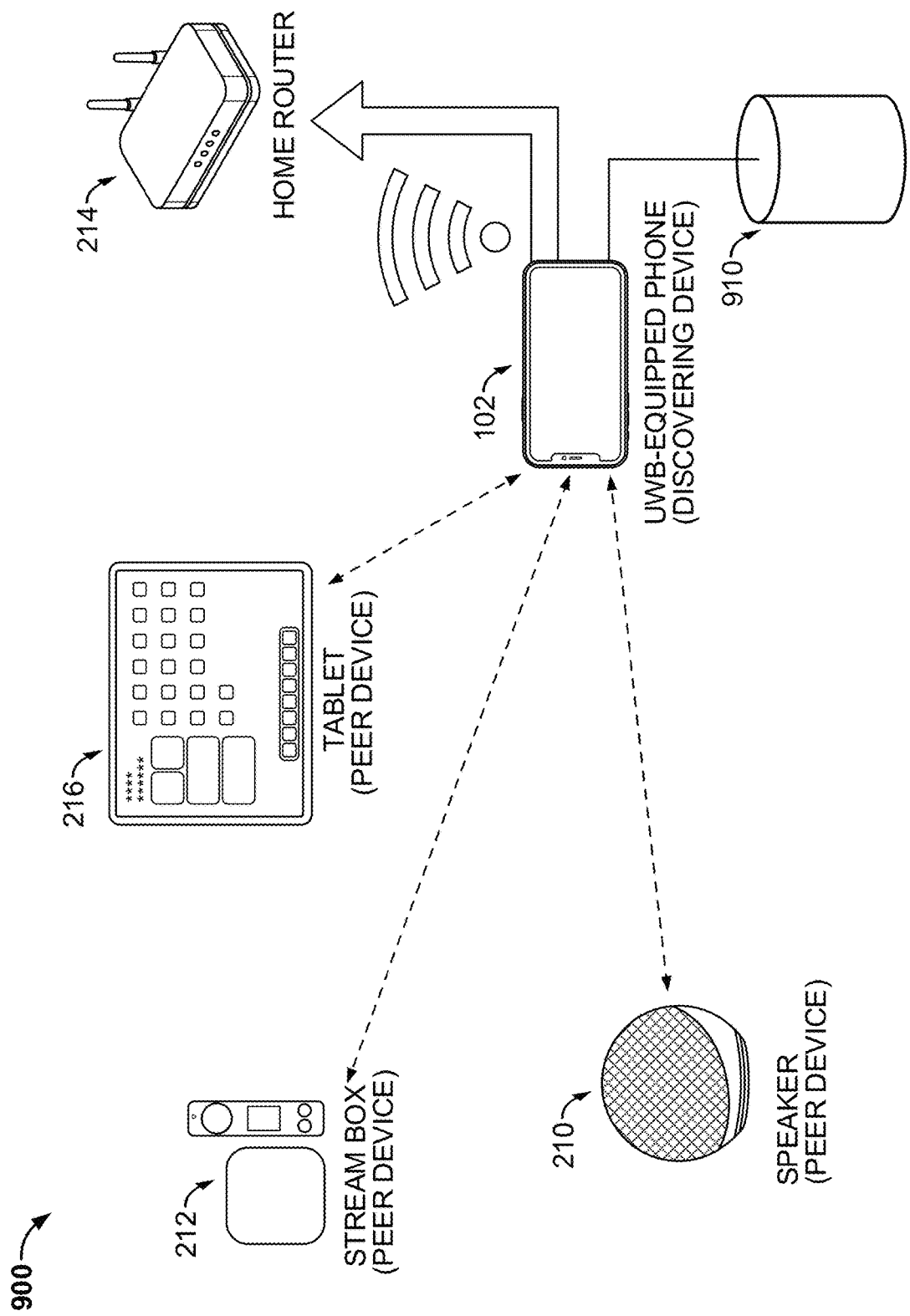
FIG. 9 shows an exemplary network configuration, in accordance with some embodiments of the present disclosure.

FIG. 9 shows an exemplary network configuration, in accordance with some embodiments of the present disclosure. Network configuration 900 is showing depicting a plurality of devices, stream box 212, tablet 216, router 214, speaker 210, network device 102 and database 910. In some embodiments, database 910 comprises database 300 and/or database 350. As depicted in network configuration 900, network device 102 may utilize UWB radio 818 of network device 102 to discovery a plurality of devices. For example, network device 102 may perform a ranging and discovery protocol with between UWB radio 818 of network device 102 and UWB radio 818 of tablet 216, UWB radio 818 of speaker 210, and UWB radio 818 of stream box 212. In some embodiments, network device 102 may transmit the results of the ranging and discovery protocol to database 910. For example, network device 102 may transmit, over Wi-Fi radio 816, the device names, identifiers (e.g., IP addresses), name etc. for storage on database 910 (e.g., which may comprise database 300 and/or database 350).

Figure 10:
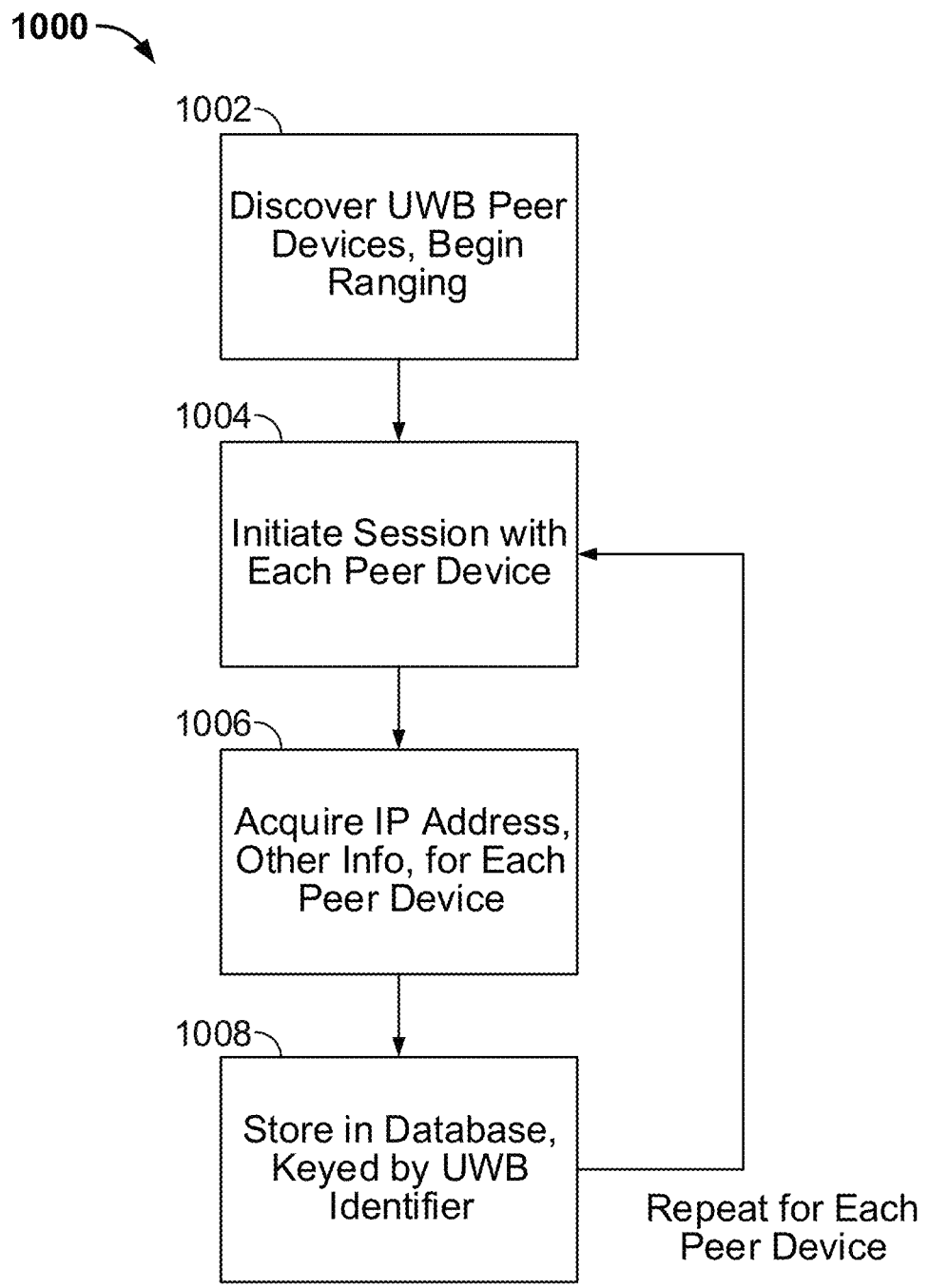
FIG. 10 shows an exemplary process for discovering devices, in an accordance with some embodiments of the present disclosure.

FIG. 10 shows an exemplary process for discovering devices, in an accordance with some embodiments of the present disclosure. Process 1000 begins at 1002 where network device 102, using control circuitry, such as control circuitry 804, discovers UWB peer devices and begins ranging. For example, control circuitry 804 may discover UWB peer devices by listing, via UWB radio 818, for other signals on the UWB frequency spectrum. For example, control circuitry 804 of network device 102 may detect via UWB radio 818 a signal from UWB radio 818 of tablet 216. In response to detecting the signal, control circuitry 804 of network device 102 may begin the ranging process as described above. For example, control circuitry 804 may receive a network address for the UWB radio 818 of tablet 216 and may compute a time of flight and an angle of arrival of the signal from UWB radio 818 of tablet 216. Subsequent to performing the ranging, control circuitry 804 may store the results of the ranging in database 910. For example, control circuitry 804 may transmit the results of the ranging (e.g., UWB identifier, relative position, and relative distance) over Wi-Fi radio 816 to be stored in database 910. In other embodiments, control circuitry 804 may store the results of the ranging in a local database such as on storage 808. Control circuitry 804 may repeat this process in parallel for each of the other detected devices (e.g., streaming device 212). It should be noted that process 1000, or any step thereof, could be performed on, or provided by, any of the devices shown in FIGS. 1-9.

At 1004, control circuitry 804 of network device 102 initiates a session with each peer device. For example, control circuitry 804 may initiate a UWB communications session with tablet 216 via the respective UWB radios 818 of each device and may transmit additional information about each of the devices during the session.

At 1006, control circuitry 804 acquires an IP address and other info for each peer device. For example, control circuitry 804 may request during the session via UWB radio 818 information about other radios of the peer devices (e.g., about Wi-Fi radio 816 of tablet 216, such as an IP address), information about the device itself (e.g., a device name, OS, device capabilities, installed applications, etc.), and/or information about a network activity of the device (e.g., whether the device streaming content).

At 1008, control circuitry 804 of network device 102 stores the acquired information in a database that is keyed based on the UWB identifier. For example, control circuitry 804 of network device 102 may stores the acquired information in a database 910. Database 910 may be organized such that a primary key for the database is represented by the UWB identifier of the network device as depicted in database 300 of FIG. 3A. Control circuitry 804 may repeat 1004, 1006, and 1008 until control circuitry 804 acquires IP addresses and other information from each of the detected devices (e.g., sensor 202, smart TV 204, camera 206, thermostat 208, speaker 210, stream box 212, router 214, and/or tablet 216).

It is contemplated that the steps or descriptions of FIG. 10 may be used with any other embodiment of this disclosure.

In addition, the descriptions described in relation to the algorithm of FIG. 10 may be done in alternative orders or in parallel to further the purposes of this disclosure.

Figure 11:
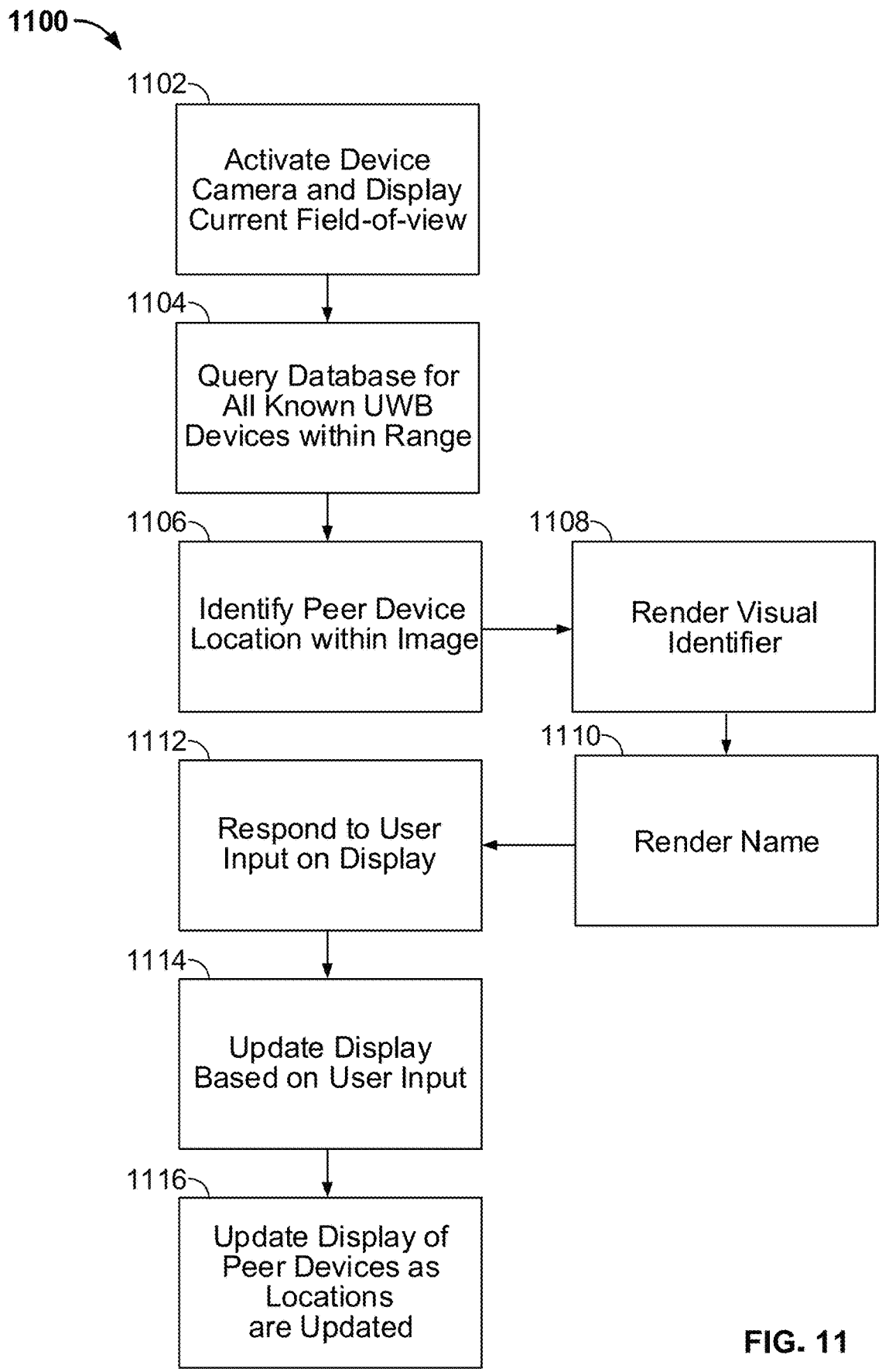
FIG. 11 shows an exemplary process for indicating a location of a device, in an accordance with some embodiments of the present disclosure.

FIG. 11 shows an exemplary process for indicating a location of a device within an image, in an accordance with some embodiments of the present disclosure. In some embodiments, the process 1100 is performed by control circuitry 804 to generate augmented reality environment 275. Process 1100 begins at 1102 where network device 102, using control circuitry, such as control circuitry 804, activates a device camera and displays a current field of view. For example, control circuitry 804 may activate a device camera (e.g., camera 106 of network device 102 via I/O interface 810 or path 802. For example, control circuitry 804 may receive an image from camera 106 and may generate the received image on a display (e.g., display 812 and/or display 104). In some embodiments, control circuitry 804 may continually receive new pictures from camera 106 (e.g., at a rate of 24 Hz images as to generate a video on display 812 and/or 104). It should be noted that process 1100, or any step thereof, could be performed on, or provided by, any of the devices shown in FIGS. 1-9.

At 1104, control circuitry 804 of network device 102 queries the database for all known UWB devices within range. For example, control circuitry 804 may query database 910 or database 300 to receive information stored in the database about all known devices (e.g., sensor 202, smart TV 204, camera 206, thermostat 208, speaker 210, stream box 212, router 214, and/or tablet 216). In some embodiments, control circuitry 804 may transmit the request over Wi-Fi radio 816 or may transmit the request to a local database stored on storage 808.

At 1106, control circuitry 804 identifies a peer device location for devices within the image (e.g., sensor 202, smart TV 204, camera 206, thermostat 208, speaker 210, stream box 212, router 214, and/or tablet 216). For example, control circuitry 804 may determine a position of each device within the image based on correlating the relative location and the distance stored in the database with pixels of the image. In some embodiments, control circuitry 804 may determine that the peer devices are visible via a transparent or semi-transparent display.

At 1108, control circuitry 804 renders a visual identifier of the device. For example, control circuitry 804 may generate a display of a circle (or any other visual indicator) around the detected device (e.g., tablet 216) as depicted in augmented reality environment 275. Control circuitry 804 may utilize the detected position of the device within the image to determine the position for the visual indicator. For example, the indicator may be centered at the position within the image or may be placed proximate to the position.

At 1110, control circuitry 804 renders a name of the device. For example, control circuitry 804 may retrieve the name of tablet 216 at 1104 and may display the retrieved name proximate to the location of the device (e.g., overlaying the device or next to the device).

At 1112, control circuitry 804 response to user input on the display. For example, control circuitry 804 may monitor (e.g., poll or receive interrupts from) I/O interface 810 that is connected to a touchscreen of display 812. In response to detecting user input, control circuitry 804 may correlate the user input on the touch screen with a displayed object or UI element displayed on display 812. In response to identifying the UI element that which the user is interacting, control circuitry 804 may determine an action to perform based on the user input. For example, control circuitry 804 may detect a swipe up on tablet 216 and based on the swipe up, may reset a network connection of tablet 216.

AT 1114 control circuitry 804 updates the display based on the user input. For example, control circuitry 804 may cause the display of an icon on display 812 to indicate that the network connection of tablet 216 is being rest and may clear the IP address and other network information from database 300.

At 1116, control circuitry 804 updates display of peer devices as locations are updated. For example, when control circuitry 804 detects that one of the devices has moved (e.g., based on detecting and performing the UWB ranging protocol or based on determining that a database entry for the device comprises a new relative position and/or distance, control circuitry 804 may cause the display of an updated augmented reality environment 275 where the position of the visual identifiers and/or names are updated to reflect the current positions.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure.

Figure 12:
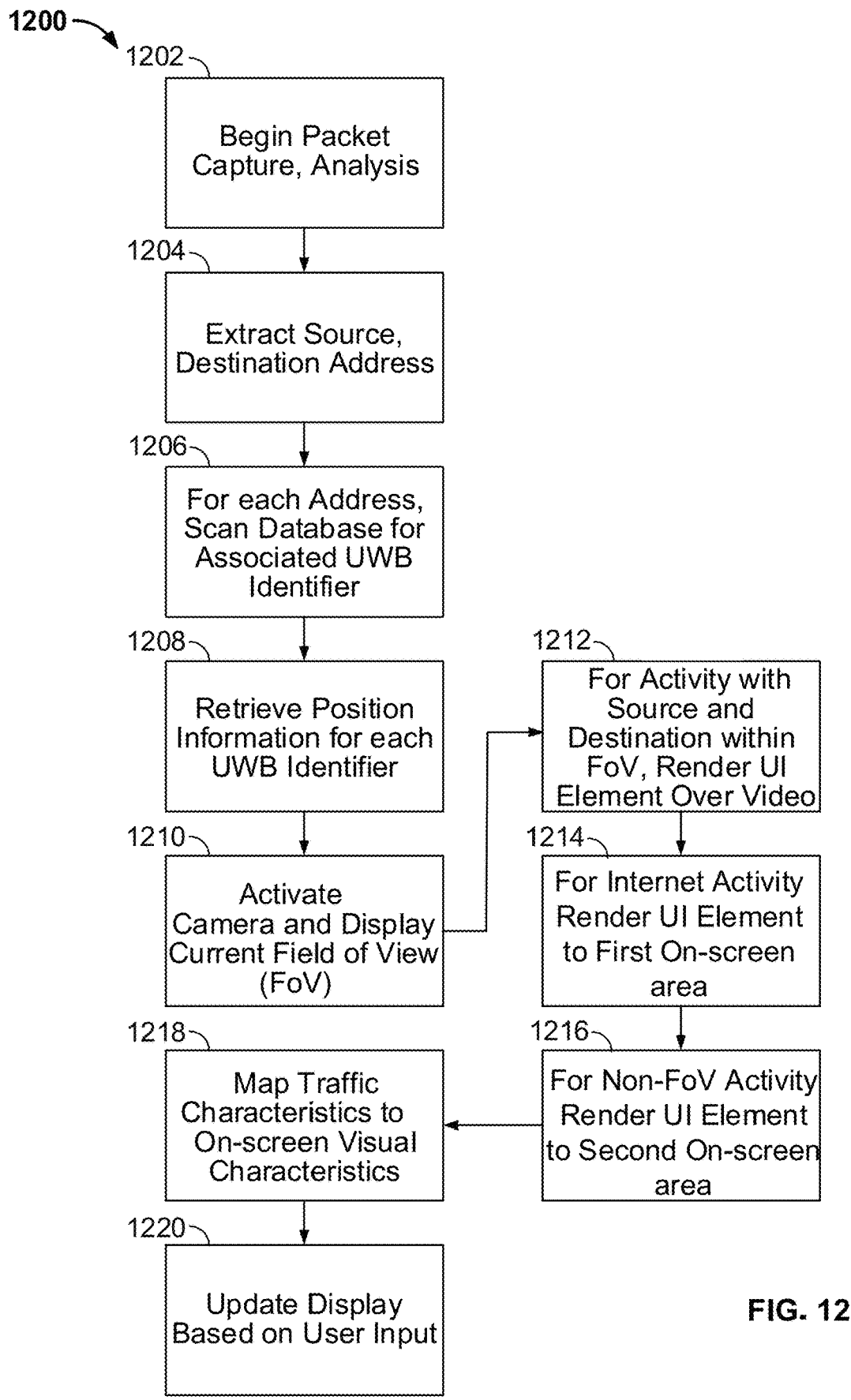
FIG. 12 shows an exemplary process for identifying a network activity, in an accordance with some embodiments of the present disclosure.

FIG. 12 shows an exemplary process for identifying a network activity, in an accordance with some embodiments of the present disclosure. Process 1200 begins at 1202 where control circuitry 804 (e.g., control circuitry 804 of network device 102 and/or control circuitry 804 of router 214) begins packet capture and analysis. For example, control circuitry 804 may monitor network traffic between devices (e.g., network device 102, sensor 202, smart TV 204, camera 206, thermostat 208, speaker 210, stream box 212, router 214, and/or tablet 216) by analyzing packets sent by each of the devices. In some embodiments, this process is performed locally (e.g., the processing is done by the device performing the packet capture, or remotely, the processing is done by a second device).

At 1204, control circuitry 804 extracts source and destination address information. For example, control circuitry 804 may examine a packet header to extract the source and destination information (e.g., IP addresses) from the packet header. Control circuitry 804 may store the information about the network activity such as the source and destination information, a size of a payload, a speed of transmission, etc. in database 910 and/or database 350. For example, control circuitry 804 may extract from the header of the packet an IP address for tablet 216 as the source and an IP address for stream box 212 as the destination.

At 1206, control circuitry 804 scans a database for an associated UWB identifier associated with each network address. For example, control circuitry 804 may determine that the packet header comprises a local IP address for both the source and destination addresses (e.g., IP addresses assigned to Wi-Fi radio 816 corresponding to each device. Control circuitry 804 may search database 300 to identify a UWB identifier corresponding to the local IP address. For example, control circuitry 804 may identify a UWB identifier for tablet 216 when control circuitry 804 detects the source IP address for tablet 216 in the packet header and may identify a UWB identifier for stream box 212 when control circuitry 804 detects the destination IP address for stream box 212 in the packet header.

At 1208, control circuitry 804 retrieves position information for each UWB identifier. For example, control circuitry 804 may search database 300 based on the UWB identifier to identify a relative position of tablet 216 and stream box 212 by searching database 300 using the UWB identifier for each respective device.

At 1210, control circuitry 804, activates a camera (e.g., camera 106 of network device 102 via I/O interface 810 or path 802) and displays the current field of view from the camera. For example, control circuitry 804 may display environment 250 as detected by camera 106 on display 812 and/or display 104.

At 1212, for network activity with a source and destination within a current field of view, control circuitry 804 renders a UI element over the video. For example, control circuitry 804 may render the traffic flow on an augmented reality display (e.g., augmented reality environment 275). For example, based on the position of tablet 216 and stream box 212 within augmented reality environment 275, control circuitry 804 may cause the display of a UI element (e.g., connection 504 between tablet 216 and stream box 212).

At 1214, for network activity over the Internet, control circuitry 804 renders a UI element on a first area of the screen. For example, control circuitry 804 may render UI element 604 comprising a listing of devices and/or services that are accessed over the Internet. Control circuitry 804 may display a UI element connecting the devices and services within UI element 604 to devices in environment 250. For example, control circuitry 804 may generate the display of connection 602 between tablet 216 and a service in UI element 604 based on determining that a network activity is between tablet 216 and a service on the Internet (e.g., by inspecting the source and destination addresses in the destination and source fields of a packet header).

At 1216, for network activity that occurs outside of a field of view, control circuitry 804 renders a UI element to a second area of the screen. For example, control circuitry 804 may display UI element 608 which may comprise a listing of devices to which a device within the field of view is communicating, such as tablet 616. For example, when stream box 212 is communicating with tablet 616, and tablet 616 is not within the field of view, control circuitry 804 may display a UI element, such as connection 606 which connects stream box 212 to indicate that both devices are communicating over a network connection (e.g., a connection via their respective Wi-Fi radios 816.

At 1218, control circuitry 804 maps traffic characteristics to on-screen visual characteristics. For example, control circuitry 804 may animate or color connections 504, 602 and 606 based on statuses of parameters of the network activities to which the connections correspond. For example, when an available bandwidth for the network activity between stream box 212 and tablet 616 is low, connection 606 may be displayed in red. Other examples of depicting such connections based on characteristics of the network activity are described above with respect to FIG. 5.

At 1220, control circuitry 804 updates the display based on user input. For example, when control circuitry 804 determines that the device (e.g., network device 102) rendering augmented reality environment 275 has moved (e.g., based on receiving input from an accelerometer via I/O interface 810 or path 802), control circuitry 804 may update the display to include new locations of each of the devices. In another example, when control circuitry 804 determines that a user has selected a UI element (e.g., based on receiving the user input via a touch screen connected to I/O interface 810 or path 802), control circuitry 804 may update the display to include an action corresponding to the user input (e.g., control circuitry 804 may display detailed information view 402 and/or UI element 552 comprising detailed network and/or device information).

It is contemplated that the steps or descriptions of FIG. 12 may be used with any other embodiment of this disclosure. In addition, the descriptions described in relation to the algorithm of FIG. 12 may be done in alternative orders or in parallel to further the purposes of this disclosure.

Figure 13:
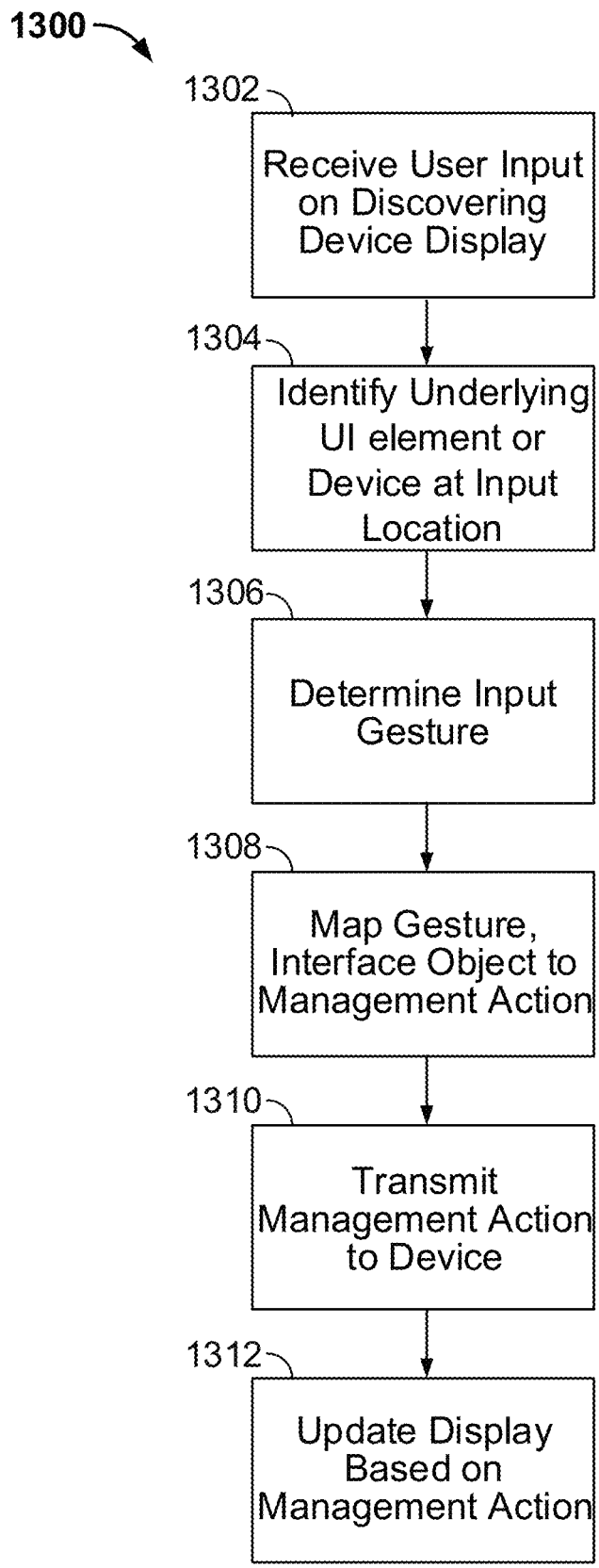
FIG. 13 shows an exemplary process for controlling a network device based on a user input, in an accordance with some embodiments of the present disclosure.

FIG. 13 shows an exemplary process for controlling a network device based on a user input, in an accordance with some embodiments of the present disclosure. Process 1300 begins at 1302 where network device 102, using control circuitry, such as control circuitry 804, receives user input on discovering device display. For example, control circuitry 804 may receive input via I/O path 810 from a touchscreen corresponding to display 812.

At 1304, control circuitry 804 identifies an underlying UI element or device at the location of the input. For example, control circuitry 804 correlates the location of the touch input with the location of a device (e.g., tablet 216) or UI element (e.g., connection 504, detailed information view 402, etc.)

At 1306, control circuitry 804 determines an input gesture. For example, control circuitry 804 may determine, based on information received from I/O interface 810 or path 802, whether the user input is a swipe, a long press, a short press, a pinch, etc.

At 1308, control circuitry 804 maps the gesture interface object to a management action. For example, long pressing on a device (e.g., tablet 216) may cause the display of detailed information about the device (e.g., detailed information view 402) while long pressing on a connection (e.g., connection 504) may cause a display of detailed information about a network activity (e.g., UI element 552) corresponding to the connection. In another example, a swipe over connection 504 may terminate a network activity between stream box 212 and tablet 216. Additional types of gestures and management actions are described above with respect to FIG. 7.

At 1310, control circuitry 804 transmits the management action to the device. For example, when the management action is to terminate the network activity between tablet 216 and stream box 212, control circuitry 804 may transmit the management action to router 214 via Wi-Fi radio 816 (e.g., so router 214 can drop packets with an origin and/or source for either device) or may transmit the management action to either of the devices (e.g., tablet 216 or stream box 212). For example, control circuitry 804 may transmit over Wi-Fi radio 816 the management action to Wi-Fi radio 816 of tablet 216 or Wi-Fi radio 816 of stream box 212.

At 1312, control circuitry 804 updates the display based on the management action. for example, control circuitry 804 may receive (via Wi-Fi radio 816) a confirmation that the network activity between tablet 216 and stream box 212 has been terminated. In response to receiving the confirmation, control circuitry 804 may cease displaying connection 504 or may display an animation indicating that the network activity has terminated.

It is contemplated that the steps or descriptions of FIG. 13 may be used with any other embodiment of this disclosure. In addition, the descriptions described in relation to the algorithm of FIG. 13 may be done in alternative orders or in parallel to further the purposes of this disclosure.

Figure 14:
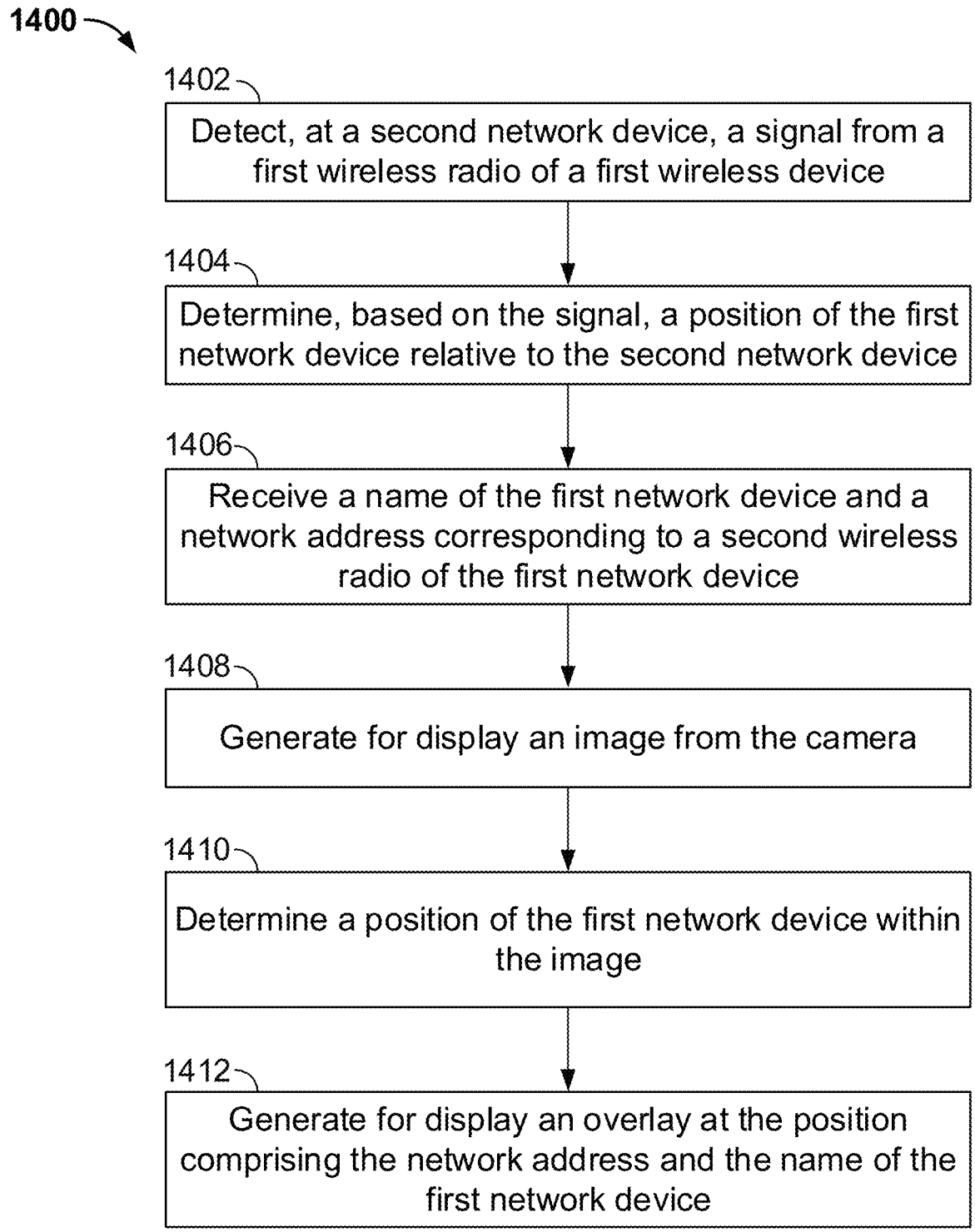
FIG. 14 shows an exemplary process for identifying network devices in an augmented reality environment, in an accordance with some embodiments of the present disclosure.

FIG. 14 shows an exemplary process for identifying network devices in an augmented reality environment, in an accordance with some embodiments of the present disclosure. Process 1400 begins at 1402 where network device 102, using control circuitry, such as control circuitry 804, detects, at a second network device, a signal from a first wireless radio of a first wireless device. For example, control circuitry 804 of network device 102 may detect a UWB signal from UWB radio 818 of tablet 216.

At 1404, control circuitry 804 determines, based on the signal, a position of the first network device relative to the second network device. For example, control circuitry 804 may use a UWB ranging protocol to detect a position and distance of tablet 216 to network device 102 (e.g., based on computing a time of flight for the UWB signal from UWB radio 818 of tablet 216 and angle of arrival of a signal as received by UWB radio 818 of network device 102.

At 1406, control circuitry 804 receives a name of the first network device and a network address corresponding to a second wireless radio of the first network device. For example, control circuitry 804 of network device 102 may receive a name of tablet 216 via UWB session between both devices. Tablet 216 may additionally transmit an indication of a network address (e.g., an IP address and/or a MAC address) corresponding to a second wireless radio of tablet 216 (e.g., Wi-Fi radio 816 of tablet 216).

At 1408, control circuitry 804 generates for display an image from the camera. For example, control circuitry 804 may generate for display on display 104 and/or display 812 an image from camera 106 received by control circuitry 804 via I/O interface 810. In some embodiments, control circuitry 804 may continually (e.g., at 30 Hz) receive images from camera 106 as to generate the display of a video on display 104 and/or display 812. In an embodiment, the control circuitry 804 does not generate for display the image. For example, the display may be an OST display that "displays" a scene by allowing light to pass through the display. In some embodiments, control circuitry 804 may determine that the first network device is visible via the display of the second network device.

At 1410, control circuitry 804 determines a position of the first network device within the image and/or display provided at the display 812. For example, control circuitry 804 may correlate the relative position of tablet 216 relative to network device 102 to a position within the image. For example, control circuitry 804 may identify a pixel and/or pixels corresponding to the first network device based on the relative position. In some embodiments, control circuitry 804 may determine the position within a transparent or semi-transparent display and may identify a pixel and/or pixels corresponding to the first network device within the transparent or semi-transparent display.

At 412, control circuitry 804 generates for display an overlay at the position comprising the network address and the name of the first network device. For example, control circuitry 804 may generate an overlay comprising the network address (e.g., the IP address of Wi-Fi radio 816 of tablet 216) and a name of tablet 216 (e.g., Tablet). In some embodiments, control circuitry 804 may display additional information about the device and/or a network activity. For example, control circuitry 804 may display, an indicator, such as a circle, centered at the position as depicted in augmented reality environment 275 of FIG. 2. In some aspects, control circuitry 804 may display any of the UI elements overlays, indicators, etc. depicted in FIGS. 1-7.

It is contemplated that the steps or descriptions of FIG. 13 may be used with any other embodiment of this disclosure. In addition, the descriptions described in relation to the algorithm of FIG. 13 may be done in alternative orders or in parallel to further the purposes of this disclosure.

Figure 15:
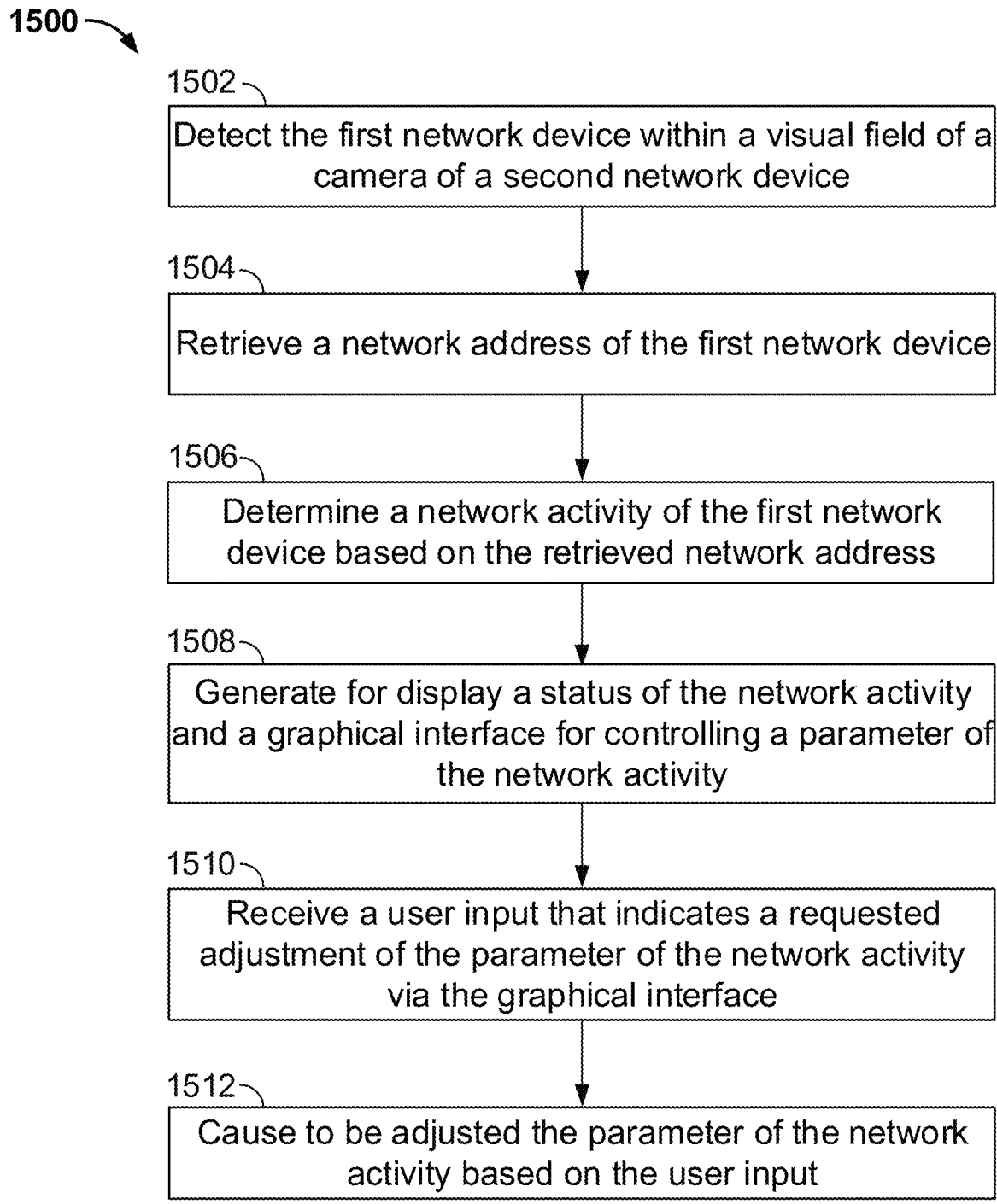
FIG. 15 shows an exemplary process for controlling network devices in an augmented reality environment, in an accordance with some embodiments of the present disclosure.

FIG. 15 shows an exemplary process for controlling network devices in an augmented reality environment, in an accordance with some embodiments of the present disclosure. Process 1500 begins at 1502 where network device 102, using control circuitry, such as control circuitry 804, detects the first network device within a visual field of a camera of the second network device. For example, network device 102 may detect, via camera 106 of network device 102 that tablet 216 is within a visual field of the camera. For example, control circuitry 804 may utilize an image processing algorithm to determine that network device 102 is within a visual field of camera 106, or control circuitry 804 may utilize known characteristics of camera 106 to determine an approximate perimeter of the field of view. Based on the approximate perimeter of the field of view, control circuitry 804 may analyze database 300 and/or database 910 to detect devices that are within the field of view of camera 106 of network device 102.

At 1504, control circuitry 804 retrieves a network address of the first network device. For example, control circuitry 804 may identify the first network device within database 300 and may retrieve a network address corresponding to the first network device from database 300. For example, control circuitry 804 may identify tablet 216 within database 300 and may retrieve a network identifier (e.g., IP address and/or MAC address) for Wi-Fi radio 816 of tablet 216.

At 1506, control circuitry 804 determines a network activity of the first network device based on the retrieved network address. For example, control circuitry 804 may retrieve, from database 350 and/or database 910 an indication of the network activity of tablet 216. For example, control circuitry 804 may transmit a request to either database comprising the network identifier (e.g., IP address or MAC address) of tablet 216 and may search for network activities having a source or destination address matching the identifier.

At 1508, control circuitry 804 generates for display a status of the network activity and a graphical interface or controlling a parameter of the network activity. For example, control circuitry 804 may generate the display of any of the UI elements described above and depicted in FIGS. 1-7 for controlling a network device. For example, control circuitry 804 may generate a display of connection 504 and enable a user to apply inputs to connection 504 to control a network activity corresponding to the connection. For example, control circuitry 804 may generate the display of connection 504 and allow a user to swipe across connection 504 to cease the network activity between tablet 216 and stream box 212.

At 1510, control circuitry 804 receives a user input that indicates a requested adjustment of the parameter of the network activity via the graphical interface. For example, control circuitry 804 may detect touch input on a touchscreen corresponding to display 104 and/or display 812. Control circuitry 804 may track the position of the touch inputs to determine that a user pinching in on connection 504. In response to determining that the user is pinching in on connection 504 (e.g., via the input received via I/O interface 810), control circuitry 804 may determine that the user requests to decrease a bandwidth of the network activity (e.g., the streaming activity between tablet 216 and stream box 212.

At 1512, control circuitry 804 causes to be adjusted the parameter of the network activity based on the user input. For example, control circuitry 804 may transmit a request to router 214 to limit, throttle and/or deprioritize packets originating and/or destined between tablet 216 and stream box 212. In another example, control circuitry 804 may transmit a request to tablet 216 or stream box 212 to reduce the bandwidth. For example, control circuitry 804 may transmit the request to an application running on stream box 212 which reduces a quality of the stream in response to receiving the request.

It is contemplated that the steps or descriptions of FIG. 15 may be used with any other embodiment of this disclosure. In addition, the descriptions described in relation to the algorithm of FIG. 15 may be done in alternative orders or in parallel to further the purposes of this disclosure.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for an augmented reality environment, the method comprising:
   detecting, at a third network device via a fourth wireless radio of the third network device, a signal from a first wireless radio of a first network device;
   in response to detecting the signal, determining, via the fourth wireless radio, based on the signal, a position of the first network device relative to the third network device;
   receiving, from the first network device, a name of the first network device and a network address corresponding to a second wireless radio of the first network device;
   determining that the first network device is visible via a display of the third network device;
   determining a position of the first network device within the display based on the position of the first network device relative to the third network device;
   identify network traffic between a third wireless radio of a second network device and the second wireless radio; and
   generating for display a) an overlay at the position, wherein the overlay comprises the network address corresponding to the second wireless radio or the name of the first network device, and b) an indication of the network traffic between the third wireless radio and the second wireless radio.

2. The method of claim 1, wherein the first wireless radio and the fourth wireless radio are ultra-wide band radios, and wherein the fourth wireless radio comprises a plurality of wireless antennas, and wherein determining a position of the first network device, further comprises (i) determining a time of flight for the signal, (ii) determining an angle of arrival of the signal based on the plurality of wireless antennas, and (iii) determining the position of the first network device based, at least in part, on the time of flight for the signal.

3. The method of claim 1, wherein the signal is a first signal, and wherein determining the position of the first network device relative to the third network device further comprises:
  determining a first time of flight for the first signal;
  receiving a second time of flight for a second signal between the first network device and a first peer device;
  receiving a third time of flight for a third signal between the first network device and a second peer device; and
  triangulating the position of the first network device based, at least in part on, the first time of flight, the second time of flight, and the third time of flight.

4. The method of claim 1, further comprising:
  determining, by a first peer device, based on a clock, a first time of arrival of the signal at the first peer device;
  receiving, by a server, the first time of arrival;
  determining, by a second peer device, based on the clock, a second time of arrival of the signal at the second peer device;
  receiving, by the server, the second time of arrival;
  calculating a position of the first network device, by the server, based at least in part on the first time of arrival and the second time of arrival; and
  wherein determining the position of the first network device relative to the third network device comprises receiving the calculated position from the server.

5. The method of claim 4, further comprising:
  detecting that the second network device comprises a wide area network connection;
  in response to detecting that the second network device comprises the wide area network connection, identifying a network address corresponding to the wide area network connection; and
  generating for display the network address corresponding to the wide area network connection at the position of the second network device within the display, wherein the network address corresponding to the wide area connection is visually distinguished from the network address corresponding to the third wireless radio.

6. The method of claim 1, further comprising:
  determining a position of the second network device relative to the third network device based on a signal from a fifth wireless radio of the second network device;
  determining a name of the second network device and a network address corresponding to the third wireless radio of the second network device;
  determining a position of the second network device within the display based on the position of the second network device relative to the third network device; and
  generating for display the name of the second network device and the network address corresponding to the third wireless radio at the position of the second network device within the display.

7. The method of claim 1, wherein the indication comprises an animation, and wherein a speed of the animation is proportional to a bandwidth of the network traffic between the third wireless radio and the second wireless radio.

8. The method of claim 1, further comprising initiating a communication session over a Wi-Fi radio of the third network device and the second wireless radio of the first network device in response to receiving the third network address corresponding to the second wireless radio.

9. The method of claim 1, further comprising:
  storing, in a database entry, the position of the first network device relative to the third network device, the network address corresponding to the second wireless radio, and the name of the first network device;
  detecting movement of the third network device; and
  in response to detecting movement of the third network device:
    determining an updated position of the first network device relative to the third network device;
    modifying the database entry based on the updated position; and
    generating for display an updated overlay at the updated position based on the modified database entry.

10. A system for an augmented reality environment, the system comprising:
  a first network device, comprising a first wireless radio and a second wireless radio;
  a second network device, comprising a third wireless radio; and
  a third network device, wherein the third network device comprises:
    a fourth wireless radio;
    a display; and
    control circuitry, wherein the control circuitry is configured to:
      detect, via the fourth wireless radio, a signal from the first wireless radio of the first device;
      in response to detecting the signal, determine, via the fourth wireless radio, based at least in part on the signal, a position of the first network device relative to the third network device;
      receive, from the first network device, a name of the first network device and a network address corresponding to the second wireless radio;
      determine that the first network device is visible via the display;
      determine a position of the first network device within the display based on the position of the first network device relative to the third network device;
      identify network traffic between the third wireless radio and the second wireless radio; and
      generate for display a) an overlay at the position, wherein the overlay comprises the network address corresponding to the second wireless radio or the name of the first network device, and b) an indication of the network traffic between the third wireless radio and the second wireless radio.

11. The system of claim 10, wherein the first wireless radio and the fourth wireless radio are ultra-wide band radios, and wherein the fourth wireless radio comprises a plurality of wireless antennas, and wherein the control circuitry is further configured, when determining a position of the first network device, to (i) determine a time of flight for the signal, (ii) determine an angle of arrival of the signal based on the plurality of wireless antennas and (iii) determine the position of the first network device based, at least in part, on the time of flight for the signal and the angle of arrival of the signal.

12. The system of claim 10, wherein the signal is a first signal, the system further comprising a first peer device and a second peer device, and wherein the control circuitry is further configured, when determining the position of the first network device relative to the third network device, to:
  determine a first time of flight for the first signal;
  receive a second time of flight for a second signal between the first network device and the first peer device;

receive a third time of flight for a third signal between the first network device and the second peer device; and triangulate the position of the first network device based, at least in part, on the first time of flight, the second time of flight, and the third time of flight.

13. The system of claim 10, further comprising a first peer device, a second peer device, and a server, wherein the first peer device and the second peer device are synchronized to a clock, wherein:
- first peer device is configured to (i) determine, based on the clock, a first time of arrival of the signal at the first peer device; and (ii) transmit the first time of arrival to the server,
- the second peer device is configured to (i) determine, based on the clock, a second time of arrival of the signal at the second peer device; and (ii) transmit the second time of arrival to the server; and
- the server is configured to calculate a position of the first network device based, at least in part on, the first time of arrival and the second time of arrival; and
- the control circuitry is further configured, when determining the position of the first network device relative to the third network device, to retrieve the calculated position of the first network device from the server.

14. The system of claim 10, wherein the second network device comprises a fifth wireless radio, and wherein the control circuitry of the third network device is further configured to:
- determine a position of the second network device relative to the third network device based on a signal from the fifth wireless radio;
- determine a name of the second network device and a network address corresponding to the third wireless radio;
- determine a position of the second network device within the display based on the position of the second network device relative to the third network device; and
- generate for display the name of the second network device and the network address corresponding to the third wireless radio at the position of the second network device within the display.

15. The system of claim 14, wherein the second network device further comprises a wide area network connection, and wherein the control circuitry is further configured to:
- detect that the second network device comprises the wide area network connection;
- in response to detecting that the second network device comprises the wide area network connection, identify a network address corresponding to the wide area network connection; and
- generate for display the network address corresponding to the wide area network connection at the position of the second network device within the display, wherein the network address corresponding to the wide area connection is visually distinguished from the network address corresponding to the third wireless radio.

16. The system of claim 10, wherein the indication comprises an animation, and wherein a speed of the animation is proportional to a bandwidth of the network traffic between the third wireless radio and the second wireless radio.

17. The system of claim 10, wherein the control circuitry is further configured to initiate a communication session over a Wi-Fi radio of the third network device and the second wireless radio of the first network device in response to receiving the second network address corresponding to the second wireless radio.

18. The system of claim 10, wherein the control circuitry is further configured to:
- store, in a database entry, the position of the first network device relative to the third network device, the network address corresponding to the second wireless radio, and the name of the first network device;
- detect movement of the third network device; and
- in response to detecting movement of the third network device:
  - determine an updated position of the first network device relative to the third network device;
  - modify the database entry based on the updated position; and
  - generate for display an updated overlay at the updated position based on the modified database entry.

* * * * *